US012703091B2

(12) United States Patent
Okuma et al.

(10) Patent No.: US 12,703,091 B2
(45) Date of Patent: Aug. 11, 2026

(54) OFFLINE TEACHING DEVICE AND OFFLINE TEACHING METHOD

(71) Applicant: Panasonic Intellectual Property Management Co., Ltd., Osaka (JP)

(72) Inventors: Katsuaki Okuma, Osaka (JP); Yoshiyuki Okazaki, Shiga (JP); Masaya Hirayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/901,795

(22) Filed: Sep. 30, 2024

(65) Prior Publication Data

US 2025/0018563 A1 Jan. 16, 2025

Related U.S. Application Data

(63) Continuation of application No. PCT/JP2023/006916, filed on Feb. 27, 2023.

(30) Foreign Application Priority Data

Mar. 31, 2022 (JP) ................................ 2022-059586

(51) Int. Cl.
*B25J 11/00* (2006.01)
*B23K 9/095* (2006.01)
(Continued)

(52) U.S. Cl.
CPC ............. *B25J 9/163* (2013.01); *B23K 9/0953* (2013.01); *B25J 11/005* (2013.01); *B25J 13/089* (2013.01)

(58) Field of Classification Search
CPC ...... B25J 13/089; B25J 11/005; B25J 9/1656; B25J 9/163; G05B 19/42; G05B 19/425;
(Continued)

(56) References Cited

U.S. PATENT DOCUMENTS 5,572,103 A 11/1996 Terada
2004/0172168 A1 9/2004 Watanabe et al.
(Continued)

FOREIGN PATENT DOCUMENTS

JP 7-84631 3/1995
JP 2004-255547 9/2004
(Continued)

OTHER PUBLICATIONS

Kim et al., PC-based off-line programming using VRML for welding robots in shipbuilding, 2004, IEEE, p. 949-954 (Year: 2004).*
(Continued)

*Primary Examiner* — Mcdieunel Marc
(74) *Attorney, Agent, or Firm* — Wenderoth, Lind & Ponack, L.L.P.

(57) ABSTRACT

An offline teaching device includes a first determination unit configured to determine whether data related to production of a workpiece to be produced by welding is changed, a second determination unit configured to determine, in a case where the first determination unit determines that the data is changed, a target whose relative position between the workpiece and a welding robot that executes the welding is changed based on the changed data, and a teaching program creation unit configured to create and output a second teaching program obtained by correcting a first teaching program for executing the welding, based on a displacement amount between a position of the target after the change of the relative position and a position of the target before the change of the relative position.

15 Claims, 9 Drawing Sheets

(51) Int. Cl.
*B25J 9/16* (2006.01)
*B25J 13/08* (2006.01)

(58) Field of Classification Search
CPC .......... G05B 2219/45104; B23K 9/127; B23K 9/0953; Y02P 90/02
See application file for complete search history.

(56) References Cited

U.S. PATENT DOCUMENTS

| | | | | |
|---|---|---|---|---|
| 2017/0087717 | A1 | 3/2017 | Hirayama et al. | |
| 2018/0250818 | A1 | 9/2018 | Maeda | |
| 2024/0176314 | A1* | 5/2024 | Beseme ............... | C12Q 1/6883 536/23.1 |

FOREIGN PATENT DOCUMENTS

| | | |
|---|---|---|
| JP | 2018-144223 | 9/2018 |
| JP | 2021-186929 | 12/2021 |
| WO | 2016/021130 | 2/2016 |

OTHER PUBLICATIONS

Gui, Simulation Design of Welding Robot Workstation Based on RobotStudio, 2022, IEEE, p. 1-5 (Year: 2022).*

Nakamura et al., Development of off-line programming system for spot welding robot, 1993, IEEE, pg., (Year: 1993).*

Du et al., An Offline-Merge-Online Robot Teaching Method Based on Natural Human-Robot Interaction and Visual-Aid Algorithm, 2021, IEEE, p. 2752-2763 (Year: 2021).*

International Search Report issued May 9, 2023 in International Application No. PCT/JP2023/006916.

* cited by examiner

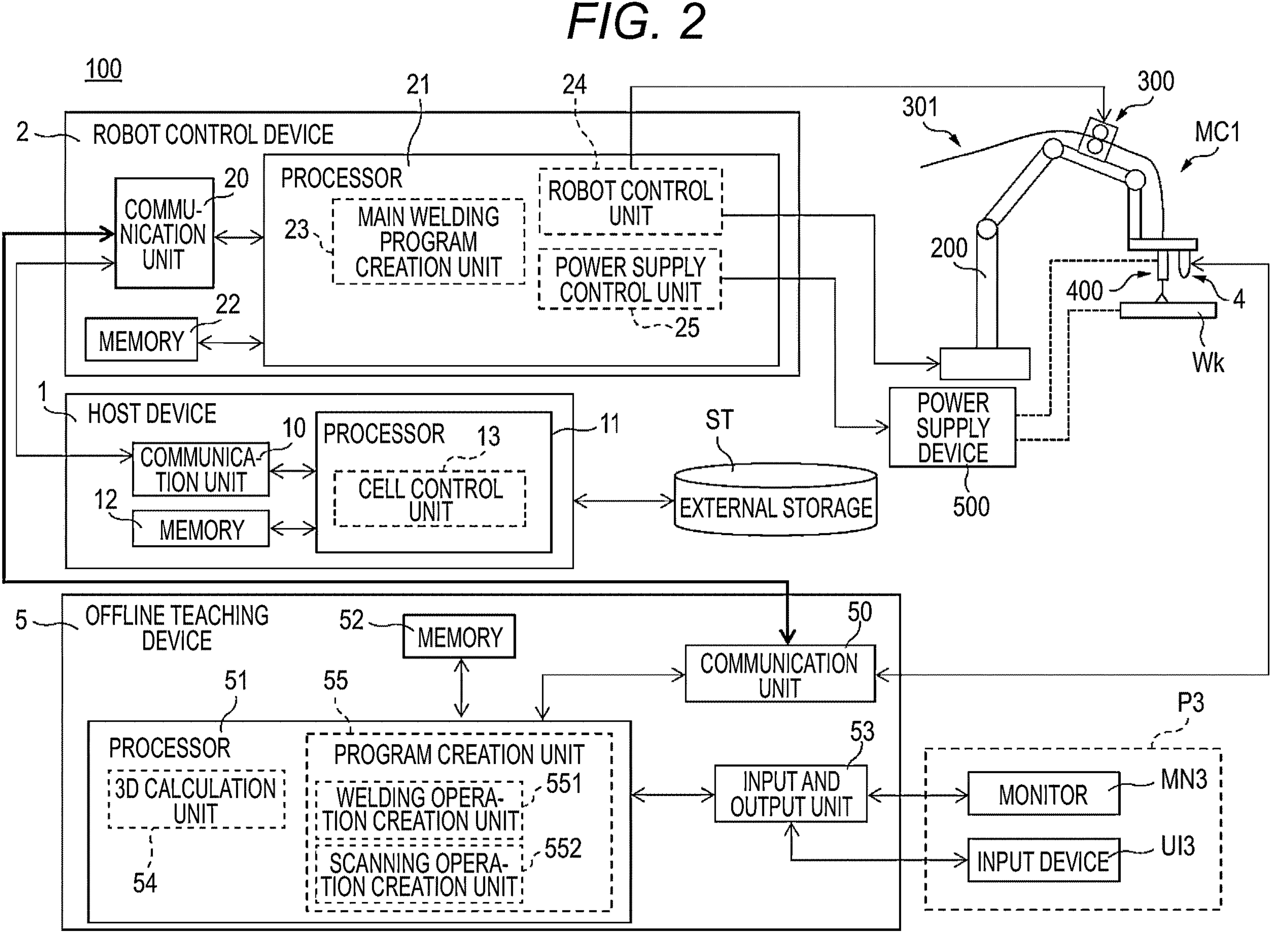
FIG. 2
100
2
ROBOT CONTROL DEVICE
21
24
PROCESSOR
ROBOT CONTROL UNIT
20
COMMU-NICATION UNIT
23
MAIN WELDING PROGRAM CREATION UNIT
POWER SUPPLY CONTROL UNIT
25
22
MEMORY
1
HOST DEVICE
10
COMMUNICA-TION UNIT
PROCESSOR
13
CELL CONTROL UNIT
11
12
MEMORY
ST
EXTERNAL STORAGE
300
301
MC1
200
400
4
Wk
POWER SUPPLY DEVICE
500
5
OFFLINE TEACHING DEVICE
52
MEMORY
50
COMMUNICATION UNIT
51
55
PROCESSOR
3D CALCULATION UNIT
54
PROGRAM CREATION UNIT
WELDING OPERA-TION CREATION UNIT
551
SCANNING OPERA-TION CREATION UNIT
552
53
INPUT AND OUTPUT UNIT
P3
MONITOR
MN3
INPUT DEVICE
UI3

FIG. 4

| FORM | POSITIONAL DEVIATION FORM | MAGNITUDE OF POSITIONAL DEVIATION | TARGET OF POSITIONAL DEVIATION | CHANGE FREQUENCY |
| --- | --- | --- | --- | --- |
| (1) | POSITIONAL DEVIATION OCCURS DUE TO CHANGE IN LAYOUT AND SO ON OF FACILITY | LARGE | ENTIRE WORKPIECE | LOW |
| (2) | POSITIONAL DEVIATION OCCURS DUE TO CHANGE IN MACHINING CONDITION AND SO ON OF WORKPIECE | SMALL | COMPONENT OF WORKPIECE | MIDDLE |
| (3) | POSITIONAL DEVIATION OCCURS FOR EACH INDIVIDUAL SUCH AS VARIATION IN MACHINING ACCURACY OF WORKPIECE | SMALL | COMPONENT OF WORKPIECE | HIGH |

FIG. 6

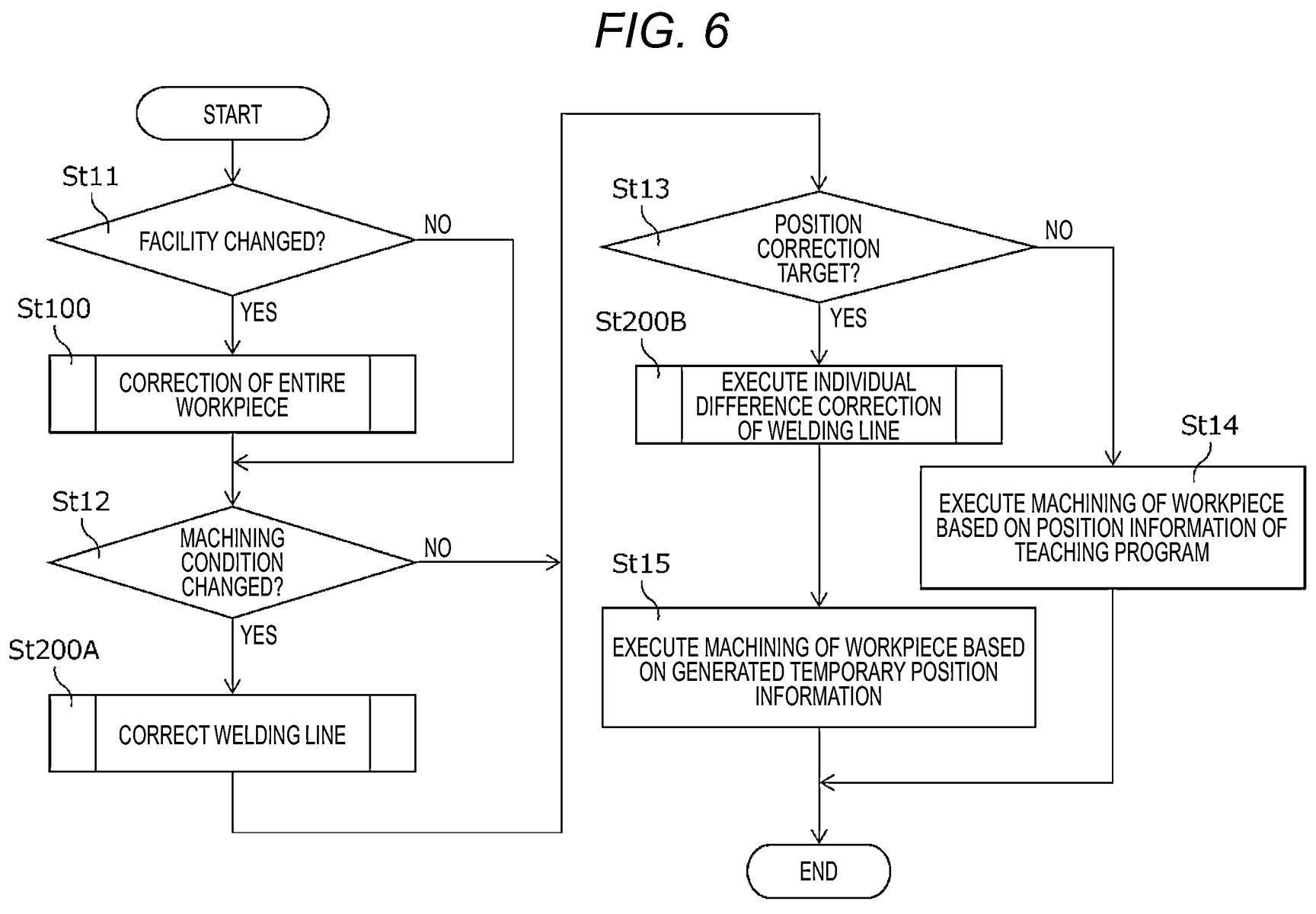

START

St11 FACILITY CHANGED?

YES

NO

St100 CORRECTION OF ENTIRE WORKPIECE

St12 MACHINING CONDITION CHANGED?

YES

NO

St200A CORRECT WELDING LINE

St13 POSITION CORRECTION TARGET?

YES

NO

St200B EXECUTE INDIVIDUAL DIFFERENCE CORRECTION OF WELDING LINE

St14 EXECUTE MACHINING OF WORKPIECE BASED ON POSITION INFORMATION OF TEACHING PROGRAM

St15 EXECUTE MACHINING OF WORKPIECE BASED ON GENERATED TEMPORARY POSITION INFORMATION

END

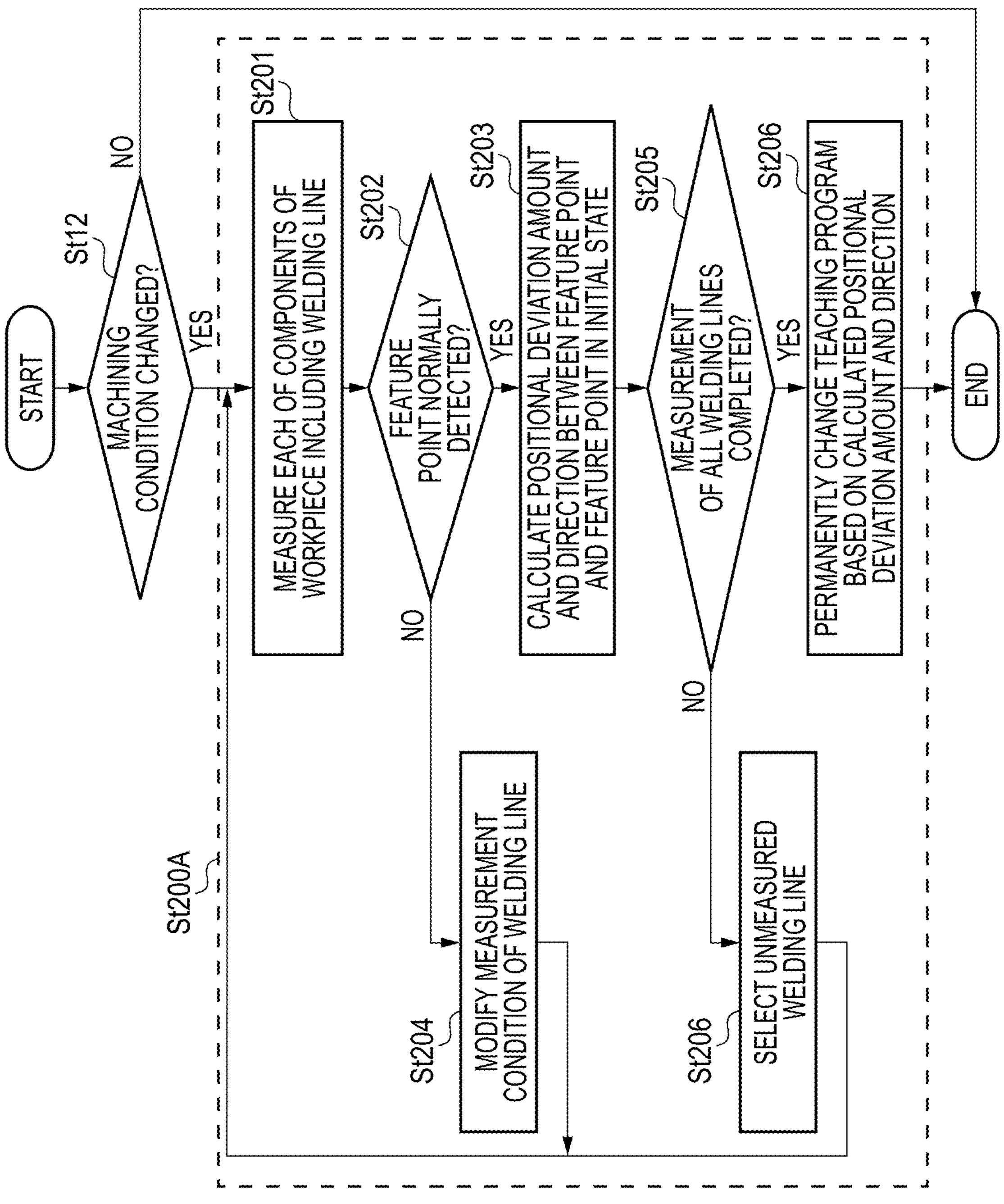
FIG. 8
START
St12
MACHINING CONDITION CHANGED?
NO
YES
St200A
St201
MEASURE EACH OF COMPONENTS OF WORKPIECE INCLUDING WELDING LINE
St202
FEATURE POINT NORMALLY DETECTED?
YES
NO
St203
CALCULATE POSITIONAL DEVIATION AMOUNT AND DIRECTION BETWEEN FEATURE POINT AND FEATURE POINT IN INITIAL STATE
St204
MODIFY MEASUREMENT CONDITION OF WELDING LINE
St205
MEASUREMENT OF ALL WELDING LINES COMPLETED?
YES
NO
St206
SELECT UNMEASURED WELDING LINE
St206
PERMANENTLY CHANGE TEACHING PROGRAM BASED ON CALCULATED POSITIONAL DEVIATION AMOUNT AND DIRECTION
END

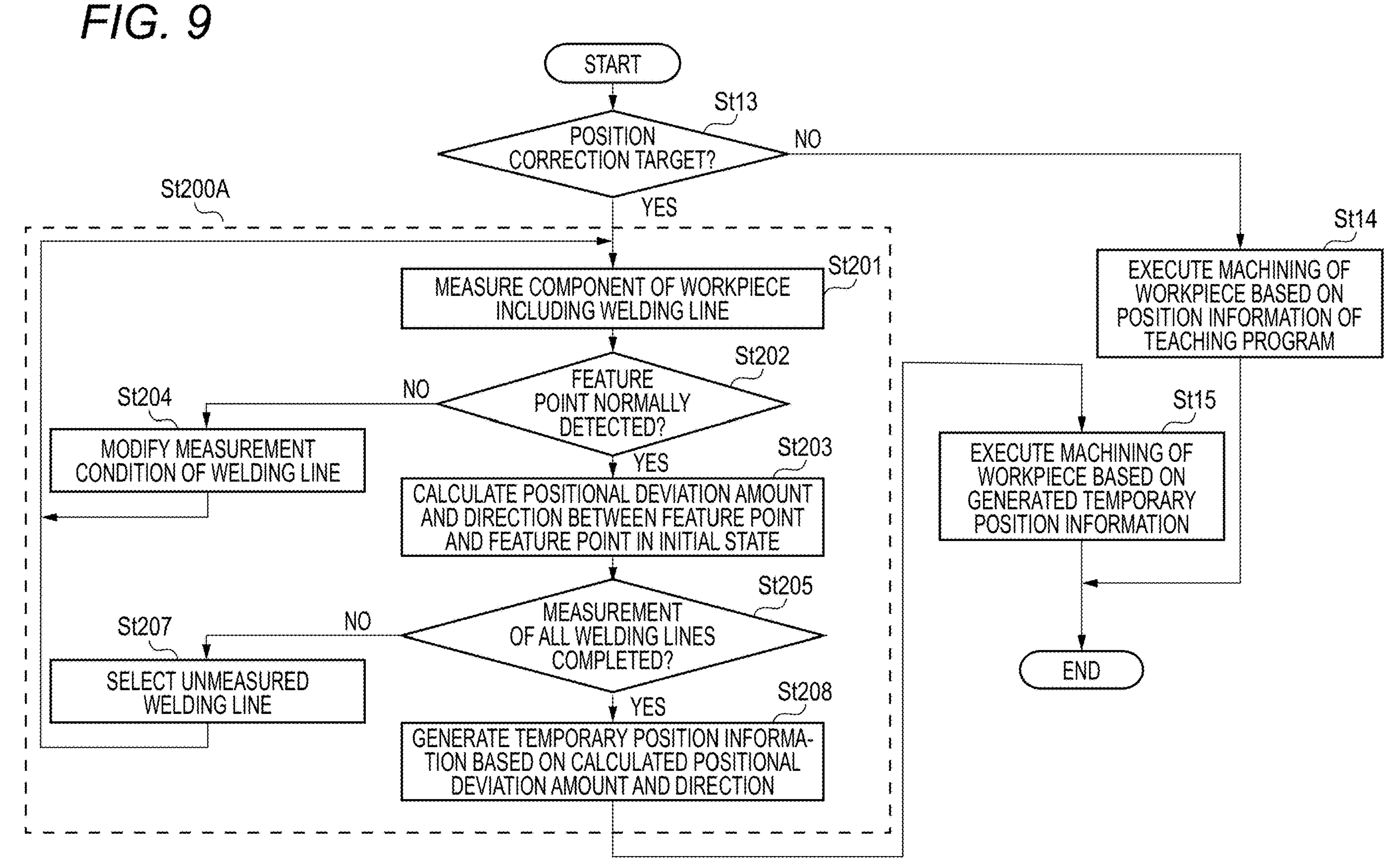
FIG. 9
START
St13
POSITION CORRECTION TARGET?
NO
YES
St200A
St201
MEASURE COMPONENT OF WORKPIECE INCLUDING WELDING LINE
St202
FEATURE POINT NORMALLY DETECTED?
NO
St204
MODIFY MEASUREMENT CONDITION OF WELDING LINE
YES
St203
CALCULATE POSITIONAL DEVIATION AMOUNT AND DIRECTION BETWEEN FEATURE POINT AND FEATURE POINT IN INITIAL STATE
St205
MEASUREMENT OF ALL WELDING LINES COMPLETED?
NO
St207
SELECT UNMEASURED WELDING LINE
YES
St208
GENERATE TEMPORARY POSITION INFORMATION BASED ON CALCULATED POSITIONAL DEVIATION AMOUNT AND DIRECTION
St14
EXECUTE MACHINING OF WORKPIECE BASED ON POSITION INFORMATION OF TEACHING PROGRAM
St15
EXECUTE MACHINING OF WORKPIECE BASED ON GENERATED TEMPORARY POSITION INFORMATION
END

OFFLINE TEACHING DEVICE AND OFFLINE TEACHING METHOD

CROSS-REFERENCE TO RELATED APPLICATIONS

This is a continuation of International Application No. PCT/JP2023/006916 filed on Feb. 27, 2023, and claims priority from Japanese Patent Application No. 2022-059586 filed on Mar. 31, 2022, the entire content of which is incorporated herein by reference.

TECHNICAL FIELD

The present disclosure relates to an offline teaching device and an offline teaching method.

BACKGROUND ART

Patent Literature 1 discloses an offline teaching device that displays, in a model diagram, an operation trajectory of a robot when a teaching program is executed and displays a part of a plurality of position detection commands and a part of a plurality of welding commands. The offline teaching device includes a display unit that displays the teaching program and the model diagram, a storage unit that stores commands constituting the teaching program and model data of the model diagram, and a control unit that controls the display unit and the storage unit. The teaching program includes a position detection program including the plurality of position detection commands and a welding program including the plurality of welding commands. Here, the commands constituting the teaching program, the position detection program, and the welding program are each created by an operator.

CITATION LIST

Patent Literature

Patent Literature 1: WO2016/021130

SUMMARY OF INVENTION

Technical Problem

The present disclosure provides an offline teaching device and an offline teaching method that more efficiently reduce man-hours for correcting a teaching point of a teaching program.

Solution to Problem

The present disclosure provides an offline teaching device including: a first determination unit configured to determine whether data related to production of a workpiece to be produced by welding is changed; a second determination unit configured to determine, when the first determination unit determines that the data is changed, a target whose relative position between the workpiece and a welding robot that executes the welding is changed based on the changed data; and a teaching program creation unit configured to create and output a second teaching program obtained by correcting a first teaching program for executing the welding, based on a displacement amount between a position of the target after the change of the relative position and a position of the target before the change of the relative position.

The present disclosure provides an offline teaching method executed by an offline teaching device including one or more computers communicably connected to a sensor capable of measuring a position of at least one target constituting a workpiece to be produced by welding, and the offline teaching method includes: determining, in a case where it is determined that data related to production of the workpiece is changed, a target whose relative position between the workpiece and a welding robot that executes the welding is changed based on the changed data; and creating and outputting a second teaching program obtained by correcting a first teaching program for executing the welding, based on a displacement amount between a position of the target after the change of the relative position and a position of the target before the change of the relative position.

The present disclosure provides an offline teaching method executed by an offline teaching device including one or more computers communicably connected to a sensor capable of measuring a position of at least one target constituting a workpiece to be produced by welding, and the offline teaching method includes: receiving an input of data in which data related to production of the workpiece is changed; determining, based on the changed data, a target whose relative position between the workpiece and a welding robot that executes the welding is changed; and creating and outputting a second teaching program obtained by correcting a first teaching program for executing the welding, based on a displacement amount between a position of the target after the change of the relative position and a position of the target before the change of the relative position.

Advantageous Effects of Invention

According to the present disclosure, it is possible to more efficiently reduce man-hours for correcting a teaching point of a teaching program.

BRIEF DESCRIPTION OF DRAWINGS

FIG. 2 is a diagram illustrating an internal configuration example of a robot control device, a host device, and an offline teaching device according to the embodiment;

FIG. 4 is a diagram illustrating form examples of a positional deviation of a workpiece;

FIG. 6 is a flowchart illustrating an operation procedure example of the offline teaching device according to the embodiment;

FIG. 8 is a flowchart illustrating a second correction procedure example of the teaching program by the offline teaching device; and FIG. 9 is a flowchart illustrating a third correction procedure example of the teaching program by the offline teaching device.

DESCRIPTION OF EMBODIMENTS

Background of Present Disclosure

Figure 1:
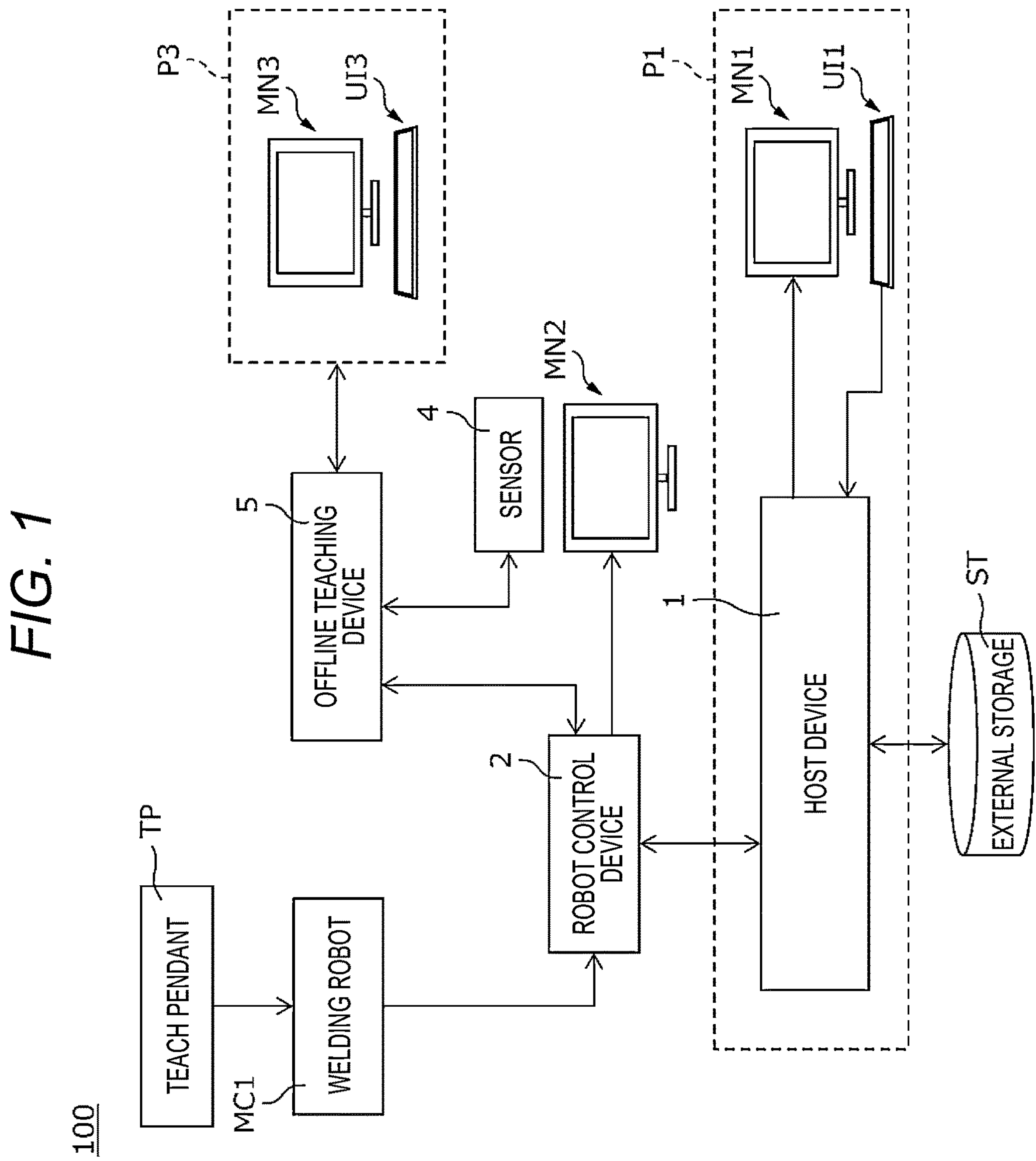
FIG. 1 is a schematic diagram illustrating a system configuration example of a welding system according to an embodiment.

As disclosed in Patent Literature 1, in the related art, there is an offline teaching device that teaches a teaching program (for example, a position detection program, a welding program) including a work procedure, an operation trajectory, and the like to a robot such as a welding robot by using an offline teaching device. The robot executes work by reading various programs corresponding to work instructions based on the work instructions.

The operation trajectory includes a position of a teaching point indicating a position at which the robot should pass and reach. In general, a relative position with respect to the robot (that is, a position based on a coordinate system of the robot) is recorded in the teaching point. Therefore, when there is a positional deviation in a position of a work object (hereinafter referred to as a "workpiece") with respect to the robot and position correction (modification) of the teaching point is not executed, there is a problem that the robot cannot reach a machining site of the workpiece.

Here, the cause of the positional deviation of the workpiece is, for example, transfer, maintenance of the facility, a change in a machining condition of the workpiece, and individual difference in the workpiece. Examples of the positional deviation of the workpiece include that a position of the entire workpiece is equally deviated, that a position of each of the components constituting the workpiece is deviated, that a deviation amount is changed for each individual during the production of each of a plurality of workpieces (that is, a temporal change is large), that a temporal change of the deviation amount is small, and the like. A degree of influence on the work is different for each positional deviation form.

Accordingly, the position correction (modification) of the teaching point is preferably executed in accordance with the positional deviation form. However, since the number of teaching points may be several hundreds to several thousands depending on the workpiece, there is a problem that the man-hours required for correction (modification) are extremely large.

Therefore, in the following embodiments, an example of an offline teaching device and an offline teaching method that more efficiently reduce man-hours for correcting a teaching point of a teaching program will be described. In the following embodiments, an example of correcting (modifying) the teaching point of the welding program of the welding robot will be described in detail, but the corrected teaching program is not limited to the welding program. For example, the teaching program may be a teaching program for a robot that is used in a welding-related application such as a scanning program for scanning an appearance of the workpiece and a repair welding program for repairing a defective welding portion, or may be any teaching program for a robot that is used in other applications such as painting and deburring.

Hereinafter, embodiments specifically disclosing an offline teaching device and an offline teaching method according to the present disclosure will be described in detail with reference to the drawings as appropriate. However, unnecessarily detailed descriptions may be omitted. For example, detailed descriptions of well-known matters and redundant descriptions of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

Hereinafter, a target (for example, metal) subjected to main welding is defined as an "original workpiece", and a target produced (manufactured) by the main welding is defined as a "workpiece". The "workpiece" is not limited to a workpiece produced by the main welding executed once, and may be a composite workpiece produced by the main welding executed two or more times. In addition, a step of producing a workpiece by joining an original workpiece and another original workpiece to each other by a welding robot is defined as "main welding".

(Configuration of Welding System)

FIG. 1 is a schematic diagram showing a system configuration example of a welding system 100 according to an embodiment. The welding system 100 includes a host device 1 connected to an external storage ST, an input interface UI1, and a monitor MN1, a robot control device 2, a sensor 4, an offline teaching device 5, a monitor MN3, an input device UI3, a welding robot MC1, and a monitor MN2. A teach pendant TP is not an essential component and may be omitted. In FIG. 1, the sensor 4 is illustrated as a separate body from the welding robot MC1, but may be provided integrally with the welding robot MC1 (see FIG. 2). The monitor MN2 is not an essential component and may be omitted.

The host device 1 integrally controls start and completion of main welding executed by the welding robot MC1 via the robot control device 2. For example, the host device 1 reads out, from the external storage ST, welding-related information input or set in advance by a user (for example, a welding operator or a system administrator. The same applies hereinafter.), generates a main welding execution command including contents of the welding-related information by using the welding-related information, and transmits the main welding execution command to the corresponding robot control device 2. When the main welding executed by the welding robot MC1 is completed, the host device 1 receives, from the robot control device 2, a main welding completion report indicating that the main welding executed by the welding robot MC1 is completed, updates to a status indicating that the corresponding main welding is completed, and records the status in the external storage ST.

The main welding execution command described above is not limited to being generated by the host device 1, and may be generated by, for example, an operation panel of a facility (for example, a programmable logic controller (PLC)) in a factory or the like where the main welding is executed, or an operation panel of the robot control device 2 (for example, the teach pendant TP). The teach pendant TP is a device for operating the welding robot MC1 connected to the robot control device 2.

Here, the welding-related information is information indicating contents of the main welding executed by the welding robot MC1, and is created in advance for each step of the main welding and is registered in the external storage ST. The welding-related information includes, for example, the number of original workpieces used in the main welding, workpiece information including an ID of the original workpiece used in the main welding, lot information, a name, and a welding portion of the original workpiece (for example, information on a welding line and position information on the welding line), a scheduled execution date on which the main welding is executed, the number of original workpieces to be produced, and various welding conditions during the main welding. The welding-related information is not limited to data of the items described above, and may further include information such as the created welding operation program and scanning operation teaching program (see description below), and welding operation setting information, scanning operation setting information, and the like used to create the teaching programs.

In addition, the welding condition includes, for example, a material and a thickness of the original workpiece, a material and a wire diameter of a welding wire 301, a type of shielding gas, a flow rate of the shielding gas, a set average value of a welding current, a set average value of a welding voltage, a feeding speed and a feeding amount of the welding wire 301, the number of times of welding, and welding time. Further, in addition to the above, the welding condition may include, for example, information indicating a type of the main welding (for example, TIG welding, MAG welding, and pulse welding), a moving speed and a moving time of a manipulator 200.

Based on the main welding execution command transmitted from the host device 1, the robot control device 2 causes the welding robot MC1 to start execution of the main welding using an original workpiece designated by the execution command. The welding-related information described above is not limited to being managed by the host device 1 with reference to the external storage ST, and may be managed by, for example, the robot control device 2. In this case, since the robot control device 2 can know a state in which the main welding is completed, an actual execution date may be managed instead of the scheduled execution date, on which a welding step is scheduled to be executed, in the welding-related information. Although a type of the main welding is not limited in the present description, in order to make the description easy to understand, a step of joining a plurality of original workpieces to produce a workpiece will be described as an example.

The host device 1 is separately connected to the monitor MN1, the input interface UI1, and the external storage ST so as to allow data input to and output from therebetween, and is further connected to the robot control device 2 so as to allow data communication therebetween. The host device 1 may be a terminal device P1 that integrally includes the monitor MN1 and the input interface UI1, and may further integrally include the external storage ST. In this case, the terminal device P1 is a personal computer (PC) that is used by the user before the main welding is executed. The terminal device P1 is not limited to the PC described above, and may be a computer device having a communication function, such as a smartphone or a tablet terminal.

The monitor MN1 may be formed using a display device such as a liquid crystal display (LCD) or an organic electroluminescence (EL). The monitor MN1 may display, for example, a screen showing a notification indicating that the main welding is completed, which is output from the host device 1. In addition, a speaker (not illustrated) may be connected to the host device 1 instead of the monitor MN1 or together with the monitor MN1, and the host device 1 may output, via the speaker, a sound of a content indicating that the main welding is completed.

The input interface UI1 is a user interface that detects an input operation of the user and outputs the input operation to the host device 1, and may be formed using, for example, a mouse, a keyboard, or a touch panel. The input interface UI1 receives, for example, an input operation when the user creates the welding-related information or an input operation when the main welding execution command is transmitted to the robot control device 2.

The external storage ST is formed using, for example, a hard disk drive or a solid state drive. The external storage ST stores, for example, data of the welding-related information created for each main welding, a status (a production status) of a workpiece Wk produced by the main welding, and workpiece information of the workpiece Wk (see above). The external storage ST may store, for each welding line, a welding operation teaching program and a scanning operation teaching program that are created by the offline teaching device 5. The welding operation teaching program and the scanning operation teaching program will be described later.

The robot control device 2 is separately connected to the host device 1 and the offline teaching device 5 so as to allow data communication therebetween, and is connected to the welding robot MC1 so as to allow data communication therebetween.

Upon receiving a scanning operation execution command transmitted from the offline teaching device 5, the robot control device 2 creates a scanning program based on the scanning operation teaching program of the workpiece corresponding to the execution command. The robot control device 2 controls the welding robot MC1 to execute a scanning operation based on the created scanning program.

When the completion of the scanning operation is detected, the robot control device 2 generates a scanning operation completion report indicating that the scanning operation is completed, and notifies the offline teaching device 5 of the main welding completion report. Accordingly, the offline teaching device 5 can appropriately detect the completion of the scanning operation by the robot control device 2.

Upon receiving the main welding execution command transmitted from the host device 1, the robot control device 2 creates a main welding program based on the welding operation teaching program corresponding to the execution command, and controls the welding robot MC1 to execute the main welding. When the completion of the main welding is detected, the robot control device 2 generates a main welding completion report indicating that the main welding is completed, and notifies the host device 1 of the main welding completion report. Accordingly, the host device 1 can appropriately detect the completion of the main welding by the robot control device 2. A method of detecting the completion of the main welding by the robot control device 2 may be, for example, a method of determining completion of the main welding based on a signal indicating the completion of the main welding from a sensor (not illustrated) provided in a wire feeding device 300, or may be a known method, and contents of the method of detecting the completion of the main welding are not limited.

Upon receiving a scanning execution command for the workpiece Wk transmitted from the host device 1, the robot control device 2 controls the welding robot MC1 (see FIG. 2) to which the sensor 4 is attached, and executes scanning for acquiring appearance shapes of the workpiece Wk and a jig FIX of the workpiece Wk.

The welding robot MC1 is connected to the robot control device 2 so as to allow data communication therebetween. The welding robot MC1 executes the main welding commanded from the host device 1 under control of the corresponding robot control device 2. In addition, the welding robot MC1 moves the sensor 4 based on the scanning operation teaching program, thereby executing the appearance scanning commanded from the host device 1.

The sensor 4 is connected to the offline teaching device 5 so as to allow data communication therebetween. The sensor 4 is attached to the welding robot MC1, and executes three-dimensional scanning of the workpiece Wk (the original workpiece) or the jig FIX (see FIG. 3) that fixes the workpiece Wk in accordance with driving of the manipulator 200 based on control of the robot control device 2. The sensor 4 acquires three-dimensional shape data of the workpiece Wk fixed and installed on the jig FIX or three-dimensional shape data (point cloud data, mesh data, and the like) capable of specifying a shape, a size, a position, and the like of the jig FIX in which the workpiece Wk is fixed and installed in accordance with the driving of the manipulator 200 based on the control of the robot control device 2, and transmits the data to the offline teaching device 5.

There may be a plurality of jigs FIX. In addition, the sensor 4 may acquire three-dimensional shape data capable of specifying a shape, a size, a position, and the like of a conveyance device or a stage on which the workpiece Wk and the jig FIX are placed instead of the jig FIX.

The monitor MN2 may be formed using a display device such as an LCD or an organic EL. The monitor MN2 displays, for example, a screen showing a notification or the like indicating that the main welding is completed, which is output from the robot control device 2. In addition, a speaker (not illustrated) may be connected to the robot control device 2 instead of the monitor MN2 or together with the monitor MN2, and the robot control device 2 may output, via the speaker, a sound indicating a notification indicating that scanning by the sensor 4 is completed or a sound indicating a content of the notification and a result.

The offline teaching device 5 is connected to the robot control device 2, the sensor 4, the monitor MN3, and the input device UI3 so as to allow data communication therebetween. The offline teaching device 5 stores, as setting information, the position information of the welding line for each workpiece Wk for which a teaching program is to be created or has been created. The offline teaching device 5 constructs a virtual facility (for example, a virtual welding robot, a virtual workpiece, a virtual stage, or the like), and creates or corrects a welding operation teaching program and a scanning operation teaching program of the workpiece Wk based on a control command and various kinds of data transmitted from the input device UI3, data transmitted from the teach pendant TP via the robot control device 2, various kinds of data output from the robot control device 2 or the sensor 4, or the like.

The offline teaching device 5 transmits the created or corrected welding operation teaching program and scanning operation teaching program to the robot control device 2. In addition, the offline teaching device 5 stores the created or corrected welding operation teaching program and scanning operation teaching program for each workpiece Wk.

Here, the position information of the welding line is information indicating a position of a welding line formed in the workpiece Wk.

Here, the welding operation teaching program is a program that is created based on the welding line and that causes the welding robot MC1 to execute the main welding. The welding operation teaching program is created including information on a position, a distance, and an angle (posture) of a welding torch 400 for executing various operations (for example, approach, retraction, avoidance, and welding) for subjecting the main welding to the workpiece Wk using the welding torch 400, and information on welding conditions and the like.

Here, the scanning operation teaching program is a teaching program for causing the sensor 4 of the welding robot MC1 to scan the workpiece Wk and the jig FIX of the workpiece Wk. The scanning operation teaching program is created including information on the position, the distance, and the angle (posture) of the sensor 4 for executing various operations (for example, approach, retraction, avoidance, and scanning) for scanning the workpiece Wk and the jig FIX of the workpiece Wk using the sensor 4.

The monitor MN3 may be formed using a display device such as an LCD or an organic EL. The monitor MN3 displays an image of the virtual facility (for example, a virtual welding robot, a virtual workpiece, and a virtual jig) transmitted from the offline teaching device 5, and displays an operation trajectory of the welding torch 400 based on the welding operation teaching program, an operation trajectory of the sensor 4 based on the scanning operation teaching program, and the like. In addition, the monitor MN3 displays an image in which the operation trajectory of the sensor 4 or the operation trajectory of the welding torch 400 is superimposed on the image of the virtual facility transmitted from the offline teaching device 5.

The input device UI3 is a user interface that detects an input operation of the user and outputs the input operation to the offline teaching device 5, and may be formed using, for example, a mouse, a keyboard, or a touch panel. The input device UI3 receives input operations of position information, welding setting information, scanning setting information, the 3D model, and the like of the welding line of the workpiece Wk used for creating the scanning operation teaching program and the welding operation teaching program, and receives a user operation related to correction (modification) of a teaching point of a welding program. Here, the monitor MN3 and the input device UI3 as referred herein may be an integrally formed terminal device P3 (for example, a PC, a notebook PC, or a tablet terminal).

The teach pendant TP is connected to the robot control device 2 via the welding robot MC1 and the welding robot MC1 so as to allow data transmission and reception therebetween. The teach pendant TP transmits, to the robot control device 2, the position information of the welding line defined by the user operation using the actual welding robot MC1 and the workpiece Wk. The teach pendant TP stores the position information of the welding line in a memory 22 (see FIG. 2) of the robot control device 2, and transmits the position information to the offline teaching device 5.

FIG. 2 is a diagram illustrating an internal configuration example of the robot control device 2, the host device 1, and the offline teaching device 5 according to the embodiment. In order to make the description easy to understand, illustration of the monitor MN1 and MN2 and the input interface UI1 is omitted in FIG. 2. The workpiece Wk illustrated in FIG. 2 is a workpiece subjected to scanning and main welding. The workpiece Wk may be a workpiece before the main welding (that is, two or more original workpieces constituting the workpiece Wk, parts, or the like), a workpiece produced by the main welding, or a so-called repair workpiece repaired one or more times by repair welding.

Under the control of the robot control device 2, the welding robot MC1 executes a main welding step based on the welding operation teaching program using the welding torch 400, a scanning step of the workpiece Wk, the jig FIX, and the like based on the scanning operation teaching program using the sensor 4, and the like. The welding robot MC1 scans the workpiece Wk, the jig FIX, and the like using the sensor 4 in order to acquire the workpiece Wk, the jig FIX, and the like used to correct or change the welding operation program. The welding robot MC1 executes, for example, arc welding in the main welding step.

The welding robot MC1 may execute welding (for example, laser welding and gas welding) other than the arc welding. In this case, although not illustrated, a laser head, instead of the welding torch 400, may be connected to a laser oscillator via an optical fiber. The welding robot MC1 is a configuration including at least the manipulator 200, the wire feeding device 300, the welding wire 301, and the welding torch 400.

The manipulator 200 includes an articulated arm, and moves each arm based on a control signal from a robot control unit 24 of the robot control device 2. Accordingly, the manipulator 200 can change a position relation (for example, an angle of the welding torch 400 relative to the workpiece Wk) between the workpiece Wk and the welding torch 400 and a position relation between the workpiece Wk and the sensor 4 by driving the arm.

The wire feeding device 300 controls the feeding speed of the welding wire 301 based on the control signal transmitted from the robot control device 2. The wire feeding device 300 may include a sensor (not illustrated) that can detect a remaining amount of the welding wire 301. Based on an output of the sensor, the robot control device 2 can detect that the main welding step is completed.

The welding wire 301 is held by the welding torch 400. When electric power is supplied from a power supply device 500 to the welding torch 400, an arc is generated between a distal end of the welding wire 301 and the workpiece Wk, and the arc welding is executed. Illustration and description of a configuration and the like for supplying shielding gas to the welding torch 400 are omitted for the convenience of description.

The host device 1 generates execution commands of the main welding or the like by using the welding-related information input or set in advance by the user, and transmits the execution commands to the robot control device 2. The host device 1 is a configuration including at least a communication unit 10, a processor 11, and a memory 12.

The communication unit 10 is separately connected to the robot control device 2 and the external storage ST so as to allow data communication therebetween. The communication unit 10 transmits, to the robot control device 2, the execution commands for the main welding or the like generated by the processor 11. The communication unit 10 receives the main welding completion report or the like transmitted from the robot control device 2, and outputs the main welding completion report or the like to the processor 11. The main welding execution command may include, for example, a control signal for controlling each of the manipulator 200, the wire feeding device 300, and the power supply device 500 that are included in the welding robot MC1.

The processor 11 is formed by using, for example, a central processing unit (CPU) or a field programmable gate array (FPGA), and executes various processes and controls in cooperation with the memory 12. Specifically, the processor 11 implements functions of a cell control unit 13 by referring to a program stored in the memory 12 and executing the program.

The memory 12 includes, for example, a random access memory (RAM) as a work memory used when a process of the processor 11 is executed, and a read only memory (ROM) that stores a program defining the process of the processor 11. Data generated or acquired by the processor 11 is temporarily stored in the RAM. The program defining the process of the processor 11 is written into the ROM. In addition, the memory 12 separately stores the data of the welding-related information read out from the external storage ST, the status of the workpiece, and data of the workpiece information of the workpiece Wk (see below) transmitted from the robot control device 2.

The cell control unit 13 generates an execution command for executing the main welding on the workpiece Wk based on the welding-related information stored in the external storage ST. The cell control unit 13 may store, in the external storage ST, the welding operation teaching program or scanning operation teaching program for each workpiece Wk created by the robot control device 2 or the offline teaching device 5. The cell control unit 13 may generate different execution commands for various steps of the main welding to be executed by the welding robot MC1. The main welding execution commands generated by the cell control unit 13 are transmitted to the corresponding robot control device 2 via the communication unit 10.

The robot control device 2 refers to a corresponding teaching program based on the main welding execution command transmitted from the host device 1. The robot control device 2 controls the welding robot MC1 (for example, the sensor 4, the manipulator 200, the wire feeding device 300, and the power supply device 500) based on the referred teaching program. The robot control device 2 is a configuration including at least a communication unit 20, a processor 21, and the memory 22.

The communication unit 20 is separately connected to the host device 1, the welding robot MC1, the offline teaching device 5, and the teach pendant TP so as to allow data communication therebetween. Although illustration is simplified in FIG. 2, data is transmitted and received between the robot control unit 24 and the manipulator 200, between the robot control unit 24 and the wire feeding device 300, and between a power supply control unit 25 and the power supply device 500 via the communication unit 20. The communication unit 20 receives the main welding execution command transmitted from the host device 1, or receives a scanning execution command transmitted from the offline teaching device 5. The communication unit 20 receives the position information of the welding line, the welding operation teaching program, and the scanning operation teaching program that are transmitted from the offline teaching device 5. The communication unit 20 transmits the workpiece information of the workpiece Wk produced by the main welding to the host device 1.

Here, the workpiece information includes not only an ID of the workpiece, but also at least information such as an ID, a name, a welding portion of the original workpiece or a component used in the main welding, a welding condition at the time of executing the main welding, jig information on the jig FIX, information indicating whether the workpiece is a position correction target, a pattern provided in the workpiece Wk or the jig FIX of the workpiece Wk. The workpiece information may further include information on the facility (the welding robot MC1, the jig FIX, and the like) in which the workpiece Wk is produced, position information of the facility, and the like.

The jig information includes at least information such as an ID, a name, and a position of at least one jig FIX for fixing the workpiece Wk, and may further include position information of a pattern for measuring a direction (angle), a position, and the like of the jig FIX. The pattern may be a marker, a mark, or the like that can measure the direction (angle), the position, and the like of the workpiece Wk or the jig FIX.

The processor 21 is formed using, for example, a CPU or an FPGA, and executes various processes and controls in cooperation with the memory 22. Specifically, the processor 21 implements functions of a main welding program creation unit 23, the robot control unit 24, and the power supply control unit 25 by referring to a program stored in the memory 22 and executing the program. In addition, the processor 21 executes, based on a main welding program generated by the main welding program creation unit 23, calculation on a parameter for controlling the welding robot MC1 (specifically, each of the manipulator 200, the wire feeding device 300, and the power supply device 500) controlled by the robot control unit 24.

The memory 22 includes, for example, a RAM as a work memory used when a process of the processor 21 is executed, and a ROM that stores a program defining the process of the processor 21. Data generated or acquired by the processor 21 is temporarily stored in the RAM. The program defining the process of the processor 21 is written into the ROM.

The memory 22 stores data of the execution command for the main welding or the scanning, the welding-related information in which the workpiece information of the workpiece Wk to be produced by the main welding, the jig information of the jig FIX, and the position information of the welding line are associated with one another, the position information of the welding line transmitted from the teach pendant TP, and the like. In addition, the memory 22 stores, for each workpiece Wk, the welding operation teaching program and the scanning operation teaching program transmitted from the offline teaching device 5 and the welding operation teaching program and the scanning operation teaching program created by the main welding program creation unit 23.

A position of a teaching point included in the welding operation teaching program and the scanning operation teaching program is created and recorded as a position based on a welding robot coordinate system ΣW of the welding robot MC1, that is, a relative position facing the welding robot MC1.

The welding-related information including the workpiece information of the workpiece Wk to which the welding operation teaching program and the scanning operation teaching program are transmitted from the offline teaching device 5 may include the welding operation teaching program and the scanning operation teaching program, position information of a welding line used to create the welding operation teaching program and the scanning operation teaching program, the welding operation setting information, and the scanning operation setting information.

Based on the main welding execution command transmitted from the host device 1, the main welding program creation unit 23 uses the workpiece information (for example, information on an ID, a name, and a component of a workpiece and position information of a welding line) of each of the plurality of original workpieces included in the execution command and the welding operation teaching program associated with the workpiece information to create a main welding program for the main welding to be executed by the welding robot MC1. The main welding program may include various parameters such as a welding current, a welding voltage, an offset amount, a welding speed, and a posture of the welding torch 400 for controlling the power supply device 500, the manipulator 200, the wire feeding device 300, the welding torch 400, and the like during the execution of the main welding. The main welding program may be stored in the processor 21 or may be stored in the RAM of the memory 22.

The robot control unit 24 generates a control signal for driving the welding robot MC1 (specifically, the sensor 4, each of the manipulator 200, the wire feeding device 300, and the power supply device 500) based on the main welding program generated by the main welding program creation unit 23. The robot control unit 24 transmits the generated control signal to the welding robot MC1.

The robot control unit 24 drives each of the manipulator 200 and the sensor 4 of the welding robot MC1 based on the scanning operation teaching program transmitted from the offline teaching device 5. Accordingly, the sensor 4 attached to the welding robot MC1 moves in accordance with an operation of the welding robot MC1, scans the workpiece Wk before production (that is, before the main welding (machining)) or the jig FIX of the workpiece Wk to acquire input data (for example, point cloud data capable of specifying a three-dimensional shape of a weld bead) related to the shape of the workpiece Wk or the jig FIX of the workpiece Wk, and transmits the input data to the offline teaching device 5.

The power supply control unit 25 drives the power supply device 500 based on a calculation result of the main welding program generated by the main welding program creation unit 23.

The sensor 4 is, for example, a three-dimensional shape sensor, is attached to a distal end of the welding robot MC1, and acquires a plurality of pieces of point cloud data capable of specifying a shape of the workpiece Wk, the jig FIX of the workpiece Wk, or a welding portion on the workpiece Wk. Based on the acquired point cloud data, the sensor 4 generates point cloud data capable of specifying three-dimensional shapes of the workpiece Wk before production (that is, before the main welding (machining)) and the jig FIX of the workpiece Wk, and transmits the point cloud data to the offline teaching device 5.

When the sensor 4 is not attached to the distal end of the welding robot MC1 and is disposed separately from the welding robot MC1, the sensor 4 may include a laser light source (not illustrated) configured to scan the workpiece Wk or the jig FIX based on the execution command transmitted from the robot control device 2 or the offline teaching device 5, and a camera (not illustrated) disposed in a manner of capable of capturing an imaging region including a periphery of the workpiece Wk or the jig FIX and configured to capture a reflection trajectory (that is, shape lines of the welding portion) of reflected laser light of laser light emitted onto the workpiece Wk or the jig FIX.

In this case, the sensor 4 transmits, to the offline teaching device 5, shape data of the workpiece Wk or the welding portion (in other words, image data of the workpiece Wk or the weld bead) based on the laser light imaged by the camera. The camera described above includes at least a lens (not illustrated) and an image sensor (not illustrated). The image sensor is, for example, a solid-state imaging device such as a charge coupled device (CCD) or a complementary metal oxide semi-conductor (CMOS), and converts an optical image formed on an imaging surface into an electrical signal.

The offline teaching device 5 is connected to the robot control device 2, the sensor 4, the monitor MN3, and the input device UI3 so as to allow data communication therebetween. The offline teaching device 5 acquires various kinds of data such as the user operation, the position information of the welding line, the welding operation setting information, and the scanning operation setting information transmitted from the input device UI3, three-dimensional shape data of the workpiece Wk and the jig FIX of the workpiece Wk transmitted from the teach pendant TP via the robot control device 2, the position information of the welding line, and the like. The offline teaching device 5 corrects the position of the teaching point included in the welding operation teaching program of the workpiece Wk based on the acquired various kinds of information to create the position information of the teaching point or corrects the welding operation teaching program based on the corrected position information of the teaching point. The offline teaching device 5 includes a communication unit 50, a processor 51, a memory 52, and an input and output unit 53.

The communication unit 50 is separately connected to the robot control device 2, the sensor 4, the input device UI3, and the monitor MN3 so as to allow data communication therebetween. The communication unit 50 transmits, to the robot control device 2, the created welding operation teaching program and scanning operation teaching program and various data (for example, the position information of the welding line, the welding operation setting information, the scanning operation setting information, the workpiece information of the workpiece Wk, and information on the jig FIX of the workpiece Wk) used for creating the welding operation teaching program and the scanning operation teaching program in association with one another.

The processor 51 is formed using, for example, a CPU or an FPGA, and executes various processes and controls in cooperation with the memory 52. Specifically, the processor 51 implements functions of a 3D calculation unit 54 and a program creation unit 55 by referring to the program stored in the memory 52 and executing the program. The processor 51 acquires a control command based on the user operation transmitted from the input device UI3. The processor 51 creates the welding operation teaching program or the scanning operation teaching program or the like in the program creation unit 55 based on the acquired control command, and causes the program creation unit 55 to correct the welding operation teaching program or the scanning operation teaching program or the like.

The memory 52 includes, for example, a RAM as a work memory used when a process of the processor 51 is executed, and a ROM that stores a program defining the process of the processor 51. Data generated or acquired by the processor 51 is temporarily stored in the RAM. The program defining the process of the processor 51 is written into the ROM. In addition, the memory 52 stores the welding operation teaching program, the scanning operation teaching program, the workpiece information, and the jig information, which are created by the program creation unit 55, in association with one another.

A position of a teaching point included in the welding operation teaching program and the scanning operation teaching program is created and recorded as a position based on a welding robot coordinate system ΣW of the welding robot MC1, that is, a relative position facing the welding robot MC1.

The input and output unit 53 acquires an input operation or an execution command based on the user operation transmitted from the input device UI3, a 3D model, the welding operation setting information, and the scanning operation setting information of the workpiece Wk, position information or three-dimensional shape data of the workpiece Wk or the jig FIX that fixes the workpiece Wk acquired by the sensor 4, the position information of the welding line transmitted from the input device UI3 or the robot control device 2, and the like, and outputs the acquired input operation or execution command, 3D model, data, and information to the processor 51. In addition, the input and output unit 53 transmits, to the monitor MN3, an image of the virtual facility (for example, a virtual welding robot, a virtual workpiece, and a virtual stage) generated by the 3D calculation unit 54 and an image in which the operation trajectory of the sensor 4 or the operation trajectory of the welding torch 400 is superimposed on the image of the virtual facility transmitted from the offline teaching device 5.

The 3D calculation unit 54 virtually forms a facility necessary for executing the main welding step and the scanning step of the workpiece Wk based on, for example, input data (that is, three-dimensional shape data) related to a shape of the workpiece Wk or the jig FIX, data of a 3D model of the workpiece Wk, the workpiece information of the workpiece Wk, the jig information on the jig FIX, and data related to the facility (for example, the position information of the jig FIX based on the welding robot MC1, robot information or position information of the welding robot MC1). The 3D calculation unit 54 converts the data of the virtually formed facility into image data, outputs the image data to the input and output unit 53, and displays the image data on the monitor MN3.

In addition, the 3D calculation unit 54 generates image data in which one or more teaching points included in the welding operation teaching program created by the program creation unit 55, the operation trajectory (specifically, an idling section, a welding section, and the like) of the welding torch 400, and the like are virtually superimposed on the facility. The 3D calculation unit 54 generates image data in which one or more teaching points included in the scanning operation teaching program created by the program creation unit 55, the operation trajectory (specifically, an idling section, a scanning section, and the like) of the sensor 4, and the like are virtually superimposed on the facility.

The 3D calculation unit 54 converts, into image data, data of a virtual facility on which data included in various teaching programs is superimposed, outputs the image data to the input and output unit 53, and displays the image data on the monitor MN3. The 3D calculation unit 54 may generate image data in which the teaching points of the welding operation and the scanning operation, the operation trajectories (specifically, an idling section, a welding section, a scanning section, and the like) of the welding torch 400 and the sensor 4, and the like are collectively superimposed on a virtual facility based on the welding operation teaching program and the scanning operation teaching program.

The program creation unit 55 creates or corrects the welding operation teaching program and the scanning operation teaching program based on the position information of the welding line (for example, data of a 3D model of the workpiece Wk or the jig FIX, the input data related to the shape of the workpiece Wk or the jig FIX, and coordinate information of a start point and an end point of the welding line), the welding operation setting information, and the scanning operation setting information. The program creation unit 55 includes a welding operation creation unit 551 and a scanning operation creation unit 552.

The welding operation creation unit 551 creates a welding operation teaching program for executing the main welding step on the workpiece Wk based on the input position information of the welding line and the welding operation setting information. The welding operation teaching program is created based on the welding robot coordinate system ΣW (see FIG. 3) of the welding robot MC1. Here, the welding operation setting information may be various welding conditions of the main welding, a group of various parameters necessary for the welding operation such as retreat positions of the welding torch 400 before the start of welding and after the end of welding.

The scanning operation creation unit 552 creates a scanning operation teaching program for executing a scanning step of the workpiece Wk or the jig FIX of the workpiece Wk based on the input position information of the welding line and the scanning operation setting information. The scanning operation teaching program is created based on the welding robot coordinate system ΣW (see FIG. 3) of the welding robot MC1. Here, the scanning operation setting information may be a group of various parameters necessary for the scanning operation of the weld bead, such as a distance between the sensor 4 and the workpiece Wk, a measurement range, and a scanning approach section.

Figure 3:
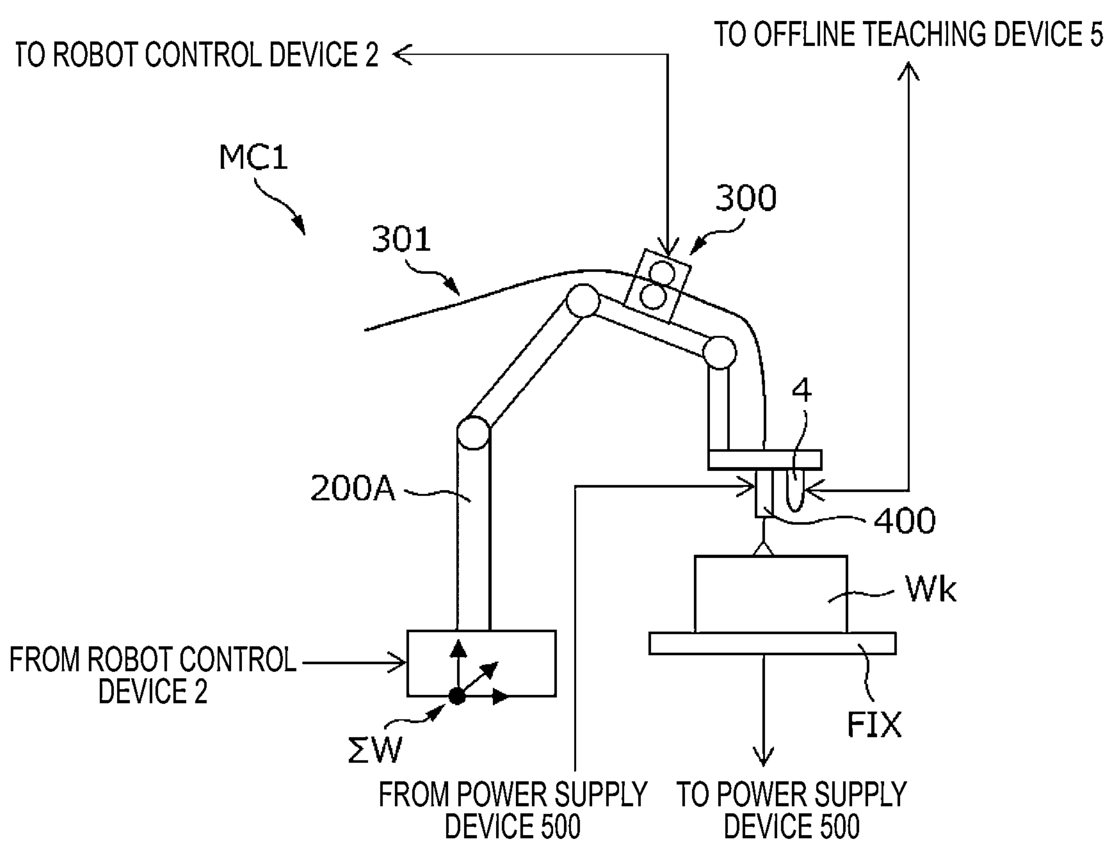
FIG. 3 is a diagram illustrating a welding robot coordinate system.

A coordinate system (the welding robot coordinate system 2W) of the welding robot MC1 will be described with reference to FIG. 3. FIG. 3 is a diagram illustrating the welding robot coordinate system ΣW. It is needless to say that the welding robot coordinate system ΣW illustrated in FIG. 3 is merely an example, but is not limited thereto.

A relative position relation between the welding robot MC1 and the workpiece Wk or the jig FIX of the workpiece Wk is defined using the welding robot coordinate system 2W set for the welding robot MC1. The welding robot coordinate system ΣW illustrated in FIG. 3 is a coordinate system of the welding robot MC1.

Figure 5:
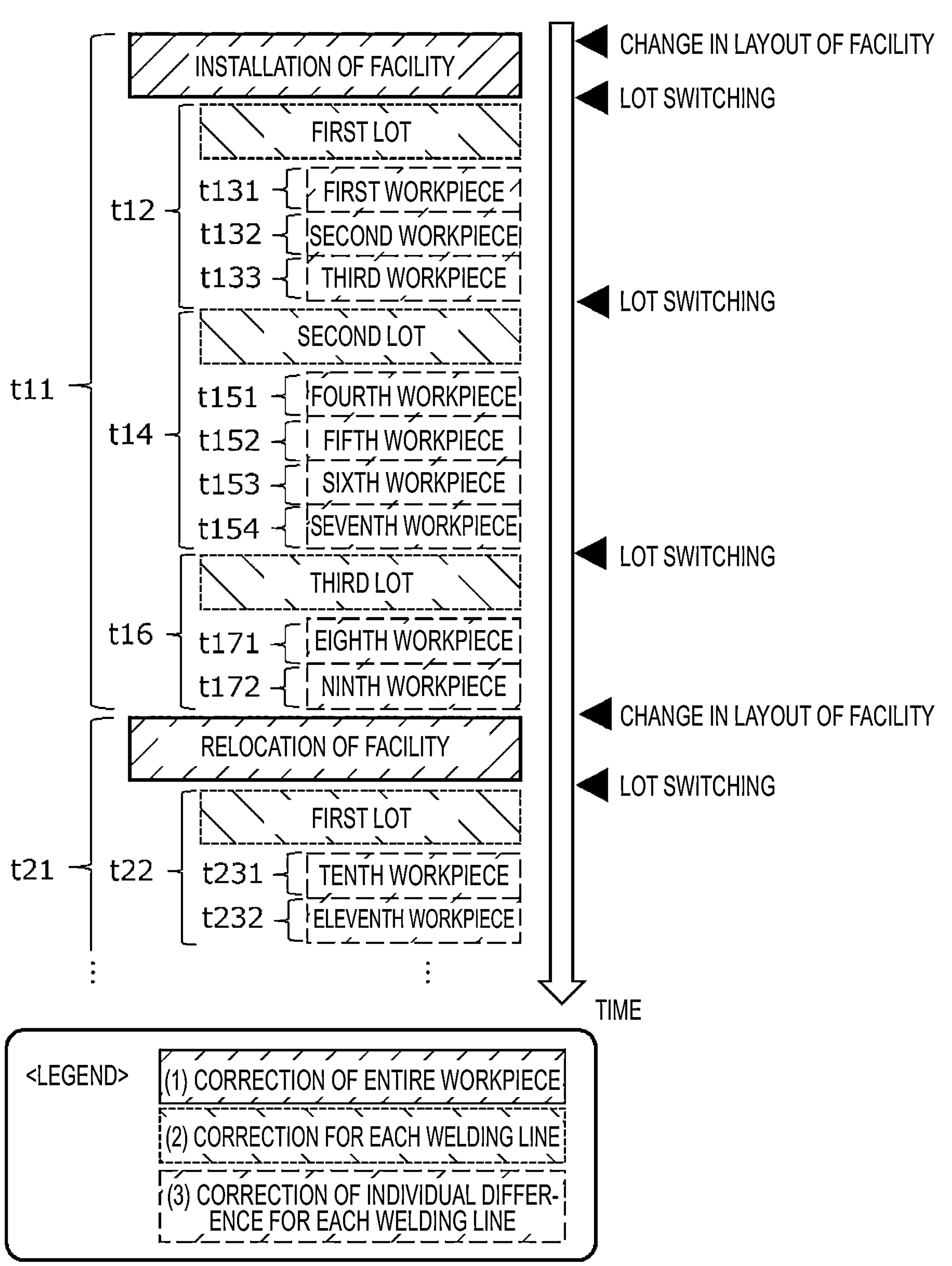
FIG. 5 is a diagram illustrating correction timing examples of a teaching program.

Next, positional deviation forms in which a teaching program is corrected will be described with reference to FIGS. 4 and 5. FIG. 4 is a diagram illustrating form examples of a positional deviation of the workpiece Wk. FIG. 5 is a diagram illustrating correction timing examples of the teaching program. The positional deviation forms and the classification of the positional deviation forms illustrated in FIG. 4 are merely examples, but the present disclosure is not limited thereto. The correction timing examples of the teaching program illustrated in FIG. 5 are merely examples, but the present disclosure is not limited thereto.

The positional deviation described in the present embodiment is classified into different forms depending on the magnitude of the positional deviation of the workpiece Wk, a target to which the positional deviation occurs, a change frequency of a positional deviation amount, and the like. Here, the change frequency of the positional deviation amount is a frequency of change in the positional deviation amount, that is, an occurrence frequency of each positional deviation form amount. Hereinafter, a correction (change) example of the welding operation teaching program will be described as an example. The positional deviation form is determined by the processor 51 of the offline teaching device 5.

A positional deviation form (1) is, for example, a positional deviation form caused by a change in a layout of an existing facility due to relocation, new installation, addition, or the like of a facility such as the welding robot MC1, the jig FIX of the workpiece Wk.

Since the positional deviation form (1) is a positional deviation form occurring at a timing when the existing facility is changed in layout, a relative position of the entire workpiece Wk including the jig FIX as the target is largely deviated with respect to the welding robot MC1. In the positional deviation form (1), the change frequency of the positional deviation amount (that is, a layout change frequency of the existing facility) is low, but a position of the entire workpiece Wk is largely deviated. Accordingly, when a positional deviation corresponding to the positional deviation form (1) occurs, the offline teaching device 5 corrects (changes) the welding operation teaching program corresponding to a layout of the changed facility. The corrected welding operation teaching program is continuously used in the machining (the main welding) of the workpiece Wk executed until the facility is changed in layout again (for example, in periods t11 and t21).

For example, the offline teaching device 5 corrects (changes) the welding operation teaching program at a timing when the existing facility is changed in layout. The welding robot MC1 executes the main welding using the corrected (changed) welding operation teaching program during the period t11 from a timing when the existing facility is changed in layout to a timing when the layout is changed next. The offline teaching device 5 corrects (changes) the welding operation teaching program at a timing when the existing facility is changed in layout again. The welding robot MC1 executes the main welding using the corrected (changed) welding operation teaching program during the period t21 from a timing when the existing facility is changed in layout to a timing when the layout is changed next.

As described above, the offline teaching device 5 corrects (changes) the welding operation teaching program at a timing when the existing facility is changed in layout. The welding robot MC1 executes the main welding using the corrected (changed) welding operation teaching program while the main welding step of the workpiece Wk is being executed in the same facility layout.

A positional deviation form (2) is, for example, a positional deviation form caused by a change of the machining condition of the workpiece Wk or switching of a lot of components and the like of the workpiece Wk (for example, an original workpiece or a component).

Since the positional deviation form (2) is a positional deviation form occurring at a timing when the machining condition of the workpiece Wk is changed or the lot of the components of the workpiece Wk (for example, an original workpiece or a component) is switched, positions of components of the workpiece Wk corresponding to the changed machining condition or the lot to be switched are deviated. In the positional deviation form (2), the position of the component of the workpiece Wk is deviated at any timing of the change frequency of the positional deviation amount (that is, the change frequency of the machining condition of the workpiece Wk and a switching frequency of the lot of the components of the workpiece Wk). Accordingly, when a positional deviation corresponding to the position deviation form (2) occurs, the offline teaching device 5 corrects (changes) the teaching program of the welding operation. The corrected welding operation teaching program is continuously used in the machining (main welding) of the workpiece Wk executed until the machining condition of the workpiece Wk or the switching of the lot of the components occurs (for example, during periods t12, t14, t16, and t22).

The offline teaching device 5 may correct a welding operation teaching program corresponding to the machining condition of the workpiece Wk or the switching of the lot of the components using the welding operation teaching program created (corrected) when the facility is changed in layout.

In addition, the offline teaching device 5 may correct a welding operation teaching program corresponding to the machining condition of the next workpiece Wk or the switching of the lot of the components using the welding operation teaching program created (corrected) before the machining condition of the workpiece Wk or the switching of the lot of the components (for example, a first lot). Specifically, the offline teaching device 5 may correct a welding operation teaching program of a third lot using the welding operation teaching program created (corrected) corresponding to the first lot, or may correct the welding operation teaching program of the third lot using the welding operation teaching program created (corrected) corresponding to a second lot.

For example, the offline teaching device 5 executes permanent correction (change) of the welding operation teaching program at a timing when the execution of the main welding step of the workpiece Wk is started using the components of the first lot. The offline teaching device 5 executes main welding using the corrected (changed) welding operation teaching program in a period (the period t12) from a timing when the execution of the main welding step of the workpiece Wk using the components of the first lot is started to the end of the main welding of the workpiece Wk using the components of the first lot. The offline teaching device 5 executes permanent correction (change) of the welding operation teaching program at a timing when the lot of the components is changed from the first lot to the second lot. The welding robot MC1 executes main welding using the corrected (changed) welding operation teaching program in a period (the period t14) from a timing when the execution of the main welding step of the workpiece Wk using the components of the second lot is started to the end of the main welding of the workpiece Wk using the components of the second lot.

As described above, the offline teaching device 5 executes permanent correction (change) of the welding operation teaching program at a timing of changing the machining condition of the workpiece Wk or switching the lot of the components. The welding robot MC1 executes main welding using the corrected (changed) welding operation teaching program while the main welding step of the workpiece Wk is being executed using the components of the same lot.

The positional deviation form (3) is, for example, a positional deviation form caused by machining accuracy, individual differences, and the like of components constituting the workpiece Wk.

Since the positional deviation form (3) is a positional deviation form caused by machining accuracy, individual differences, and the like of components constituting the workpiece Wk, the positions of the components are randomly deviated. In addition, in the positional deviation form (3), the change frequency of the positional deviation amount occurs for each workpiece Wk (that is, frequently), and the position of the component of the workpiece Wk is deviated. Accordingly, the offline teaching device 5 executes temporary position correction (change) of the teaching points included in the welding operation teaching program for each workpiece Wk.

The offline teaching device 5 may correct a welding operation teaching program corresponding to the machining condition of the workpiece Wk or the switching of the lot of the components using the welding operation teaching program created (corrected) when the facility is changed in layout. The offline teaching device 5 may correct a welding operation teaching program corresponding to an individual difference of the workpiece Wk to be machined next using a welding operation teaching program corresponding to a machining condition of the workpiece Wk to be machined or a lot of the components.

For example, the offline teaching device 5 acquires or creates a welding operation teaching program used in a main welding step of a first workpiece Wk at a timing before starting the execution of the main welding step of the first workpiece Wk using the components of the first lot. The offline teaching device 5 executes temporary position correction (change) of teaching points included in the acquired or created welding operation teaching program, and creates a welding operation teaching program used in the main welding step of the first workpiece Wk (that is, a period t131). The welding robot MC1 executes the main welding step of the first workpiece Wk using the created welding operation teaching program.

The welding system 100 repeats temporary position correction (change) of the teaching points included in the welding operation teaching program more suitable for the main welding of each workpiece Wk and execution of the main welding step of the workpiece Wk using the welding operation teaching program corrected (changed) by the welding robot MC1 in the same manner for a second workpiece Wk and a third workpiece Wk in which the main welding step is executed by the offline teaching device 5.

As described above, the offline teaching device 5 executes temporary position correction (change) of the welding operation teaching program in the main welding step executed for each workpiece Wk. The welding robot MC1 executes main welding of the workpiece Wk using the corrected (changed) welding operation teaching program.

In the above-described positional deviation forms (1) and (2), the offline teaching device 5 may record welding operation teaching programs before and after the correction (change) in the memory 22, or may overwrite the welding operation teaching program before the correction (change) with the welding operation teaching program after the correction (change) and record the welding operation teaching programs in the memory 22.

Next, an operation procedure of the offline teaching device 5 will be described with reference to FIG. 6. FIG. 6 is a flowchart illustrating an operation procedure example of the offline teaching device 5 in the embodiment.

The offline teaching device 5 determines whether the existing facility is changed based on the user operation (the control command) output from the input device UI3 or data related to production (for example, information related to the facility, workpiece information of the workpiece Wk, and the jig information of the workpiece Wk) (St11). Here, the facility indicates various facilities (for example, the welding robot MC1, the jig FIX) that executes main welding of the workpiece Wk. A change in the facility includes relocation, addition, and new installation of the facility, changes in layout of various facilities, and the like.

In response to determining in the process of step St11 that the existing facility is changed (St11, YES), the offline teaching device 5 determines that a positional deviation occurs in the entire workpiece Wk, and corrects the welding operation teaching program using the entire workpiece Wk (that is, the components constituting the workpiece Wk (an original workpiece, a component, and the like), the jig FIX of the workpiece Wk, and the like) as a positional deviation target (St100). Here, the positional deviation form based on the change in the facility is the positional deviation form (1) illustrated in FIG. 4.

On the other hand, in response to determining in the process of step St11 that the existing facility is not changed (St11, NO), the offline teaching device 5 determines whether the machining condition of the workpiece Wk is changed based on the user operation (the control command) output from the input device UI3 or the data related to the production (St12). In the process of step St12, the offline teaching device 5 may determine whether a lot of the components or the like of the workpiece Wk (for example, an original workpiece or a component) are switched based on the control command based on the user operation output from the input device UI3.

In response to determining in the process of step St12 that the machining condition of the workpiece Wk is changed (St12, YES), the offline teaching device 5 determines that a positional deviation occurs in the component of the workpiece Wk corresponding to the machining condition of the workpiece Wk having a change. The offline teaching device 5 corrects the welding operation teaching program which is a positional deviation target of the component of the workpiece Wk corresponding to the machining condition (St200A).

In step St200A, in response to determining that the lot is switched, the offline teaching device 5 may correct the welding operation teaching program which is the positional deviation target of the component of the workpiece Wk as a switching target of a lot. Here, the positional deviation form based on the machining condition of the workpiece Wk and the switching of the lot of the components of the workpiece Wk is the positional deviation form (2) illustrated in FIG. 4.

On the other hand, in response to determining in the process of step St12 that the machining condition of the workpiece Wk is not changed (St12, NO), the offline teaching device 5 determines whether the workpiece Wk as a next main welding target is set as a position correction target (St13). In the process of step St13, the offline teaching device 5 may receive a user operation as to whether the workpiece Wk is a position correction target via the input device UI3, and determine whether the workpiece Wk is a position correction target based on the received user operation.

In response to determining in the process of step St13 that the workpiece Wk as the next main welding target is set as the position correction target (St13, YES), the offline teaching device 5 measures a positional deviation of the workpiece Wk as the next main welding target, and executes individual difference correction of the welding line based on the measured positional deviation (St200B). Here, the positional deviation form of the workpiece Wk set as the position correction target is the position deviation form (3) illustrated in FIG. 4.

The offline teaching device 5 executes individual difference correction of the welding line to generate temporary position information used in the main welding step of the workpiece Wk. The offline teaching device 5 transmits the generated temporary position information to the robot control device 2, and executes machining (the main welding) of the workpiece Wk (St15).

On the other hand, in response to determining in the process of step St13 that the workpiece Wk as the next main welding target is not set as the position correction target (St13, NO), the offline teaching device 5 transmits the created welding operation teaching program of the workpiece Wk to the robot control device 2, and executes machining (the main welding) of the workpiece Wk (St14).

As described above, the offline teaching device 5 according to the embodiment can correct the welding operation teaching program in accordance with the positional deviation form of the workpiece Wk. Accordingly, the offline teaching device 5 can realize improvement in efficiency of the correction of the welding operation teaching program suitable for the positional deviation form and the correction of the welding operation teaching program.

Figure 7:
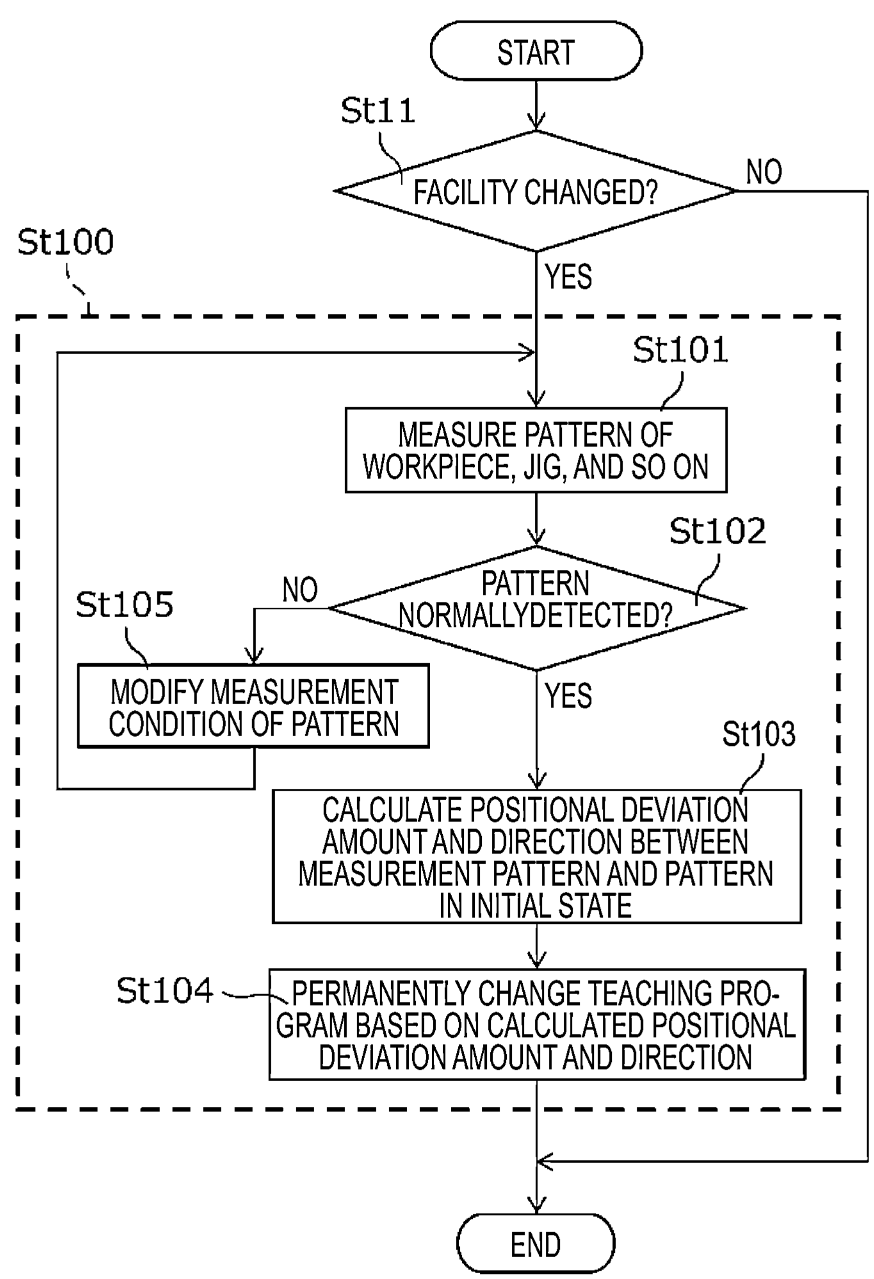
FIG. 7 is a flowchart illustrating a first correction procedure example of the teaching program by the offline teaching device.

Next, an operation procedure of the offline teaching device 5 in the positional deviation form (1) will be described with reference to FIG. 7. FIG. 7 is a flowchart illustrating a first correction procedure example of the teaching program by the offline teaching device 5. Here, the first correction procedure is a correction procedure of the welding operation teaching program corresponding to the positional deviation form (1), and illustrates a correction procedure of the welding operation teaching program executed when the correction of the welding operation teaching program of the entire workpiece Wk is necessary.

The offline teaching device 5 determines whether there is a change in the existing facility based on the user operation (the control command) output from the input device UI3 or the data related to production (St11).

In response to determining in the process of step St11 that there is a change in the existing facility (St11, YES), the offline teaching device 5 generates a control command for scanning the workpiece Wk and the jig FIX for fixing the workpiece Wk based on the workpiece information, the jig information, and the like, and transmits the control command to the robot control device 2.

The robot control device 2 acquires the control command transmitted from the offline teaching device 5, and drives the sensor 4 of the welding robot MC1 based on the scanning operation teaching program corresponding to the workpiece Wk which is designated by the control command and recorded in advance. The sensor 4 scans the workpiece Wk and the jig FIX for fixing the workpiece Wk, and transmits the three-dimensional shape data, which is a scanning result of the workpiece Wk and the jig FIX, to the offline teaching device 5.

The offline teaching device 5 detects a pattern provided on the workpiece Wk or the jig FIX based on the three-dimensional shape data (the scanning result) transmitted from the sensor 4. Here, the detected pattern is a mark, a marker, any hole, an edge of a component, or the like provided at a predetermined position on a component of the workpiece Wk (for example, an original workpiece, a component, or the like) or on the jig FIX. The offline teaching device 5 measures a position and direction (angle) of the detected pattern (St101). Here, the direction (angle) is an angle based on the welding robot coordinate system ΣW.

The offline teaching device 5 compares the measured position of the pattern or the marker with the position of the pattern included in the workpiece information or the jig information, and determines whether the pattern is normally detected (St102). Here, "normally" may indicate that the pattern is detected, or may indicate that a probability that the detected pattern is a pattern to be detected is equal to or more than a predetermined value.

In response to determining in the process of step St102 that the pattern is normally detected (St102, YES), the offline teaching device 5 calculates each of the measured positional deviation amount and direction (a positional deviation angle) of the pattern based on the measured position of the pattern and a position of the pattern in an initial state (St103). Here, the position of the pattern in the initial state is position information and angle information of a pattern stored in the workpiece information of the workpiece Wk or the jig information of the jig FIX.

On the other hand, in response to determining in the process of step St102 that the pattern is not normally detected (St102, NO), the offline teaching device 5 modifies a measurement condition of a pattern of the workpiece Wk (St105). Here, the measurement condition of the pattern is a condition for scanning a pattern provided in the workpiece Wk or the jig FIX and measuring a position, a direction, and the like of the pattern, and is a condition such as a scanning speed of the sensor 4, a resolution, a filtering intensity of an optical sensor, a noise removal level, a frequency band, filtering (a low-pass filter, enabling/disabling of a high-pass filter), and smoothing.

The offline teaching device 5 generates a control command for re-scanning the modified measurement condition of the pattern, the workpiece Wk, and the jig FIX for fixing the workpiece Wk, and transmits the control command to the robot control device 2 (St101).

The offline teaching device 5 corrects the welding operation teaching program by changing the position information and the angle information of all the teaching points included in the welding operation teaching program corresponding to the workpiece Wk so as to cancel each of the calculated positional deviation amount and direction (the positional deviation angle) of the pattern, based on each of the calculated positional deviation amount and direction (the positional deviation angle) of the pattern (St104). The offline teaching device 5 permanently changes the welding operation teaching program before correction to the corrected welding operation teaching program (St104). The offline teaching device 5 stores the welding operation teaching program after the correction in the memory 52, and transmits the welding operation teaching program after the correction to the robot control device 2 for storage. Here, the "permanently" indicates a period from a timing when the process of step St104 is completed to a timing when the teaching program to be permanently changed is created again.

The offline teaching device 5 may correct not only the welding operation teaching program but also the scanning operation teaching program. When the scanning operation teaching program is corrected, the offline teaching device 5 stores the welding operation teaching program after the correction in the memory 52, and transmits the welding operation teaching program after the correction to the robot control device 2 for storage.

As described above, when a positional deviation occurs in the entire workpiece Wk due to a change in a layout or the like of the facility (that is, when a positional deviation corresponds to the positional deviation form (1) occurs), the offline teaching device 5 according to the embodiment calculates a position difference and an angle difference between the position and the angle of the pattern in the initial state and a position and an angle of the pattern after a change in the facility. Accordingly, the offline teaching device 5 can collectively correct positions and angles of all the teaching points included in the welding operation teaching program. That is, the offline teaching device 5 can realize more efficient correction of the welding operation teaching program.

In addition, when a positional deviation occurs in which the occurrence frequency of the layout or the like of the facility is low (that is, when a positional deviation corresponds to the positional deviation form (1) occurs), the offline teaching device 5 continues to use the welding operation teaching program after the correction until the layout of the facility is changed again (for example, the period t11, t21 illustrated in FIG. 5). Accordingly, the offline teaching device 5 can more effectively prevent an increase in a correction frequency or a correction amount of the welding operation teaching program.

Next, an operation procedure of the offline teaching device 5 in the positional deviation form (2) will be described with reference to FIG. 8. FIG. 8 is a flowchart illustrating a second correction procedure example of the teaching program by the offline teaching device 5. Here, the second correction procedure is a correction procedure of the welding operation teaching program corresponding to the positional deviation form (2), and illustrates a correction procedure of the welding operation teaching program executed when the correction of the welding operation teaching program is necessary for each welding line of the workpiece Wk.

In response to determining in the process of step St12 that the machining condition of the workpiece Wk and the lot of the components or the like of the workpiece Wk (for example, an original workpiece and a component) are switched based on the user operation (the control command) output from the input device UI3 or the data related to the production (St12, YES), the offline teaching device 5 determines that a positional deviation of the positional deviation form (2) occurs in the component of the workpiece Wk corresponding to the machining condition of the workpiece Wk having a change. The offline teaching device 5 acquires position information of the welding line included in the workpiece information of the workpiece Wk. The offline teaching device 5 generates a control command for scanning the welding line and the component of the workpiece Wk including a vicinity of the welding line based on the position information of the welding line, and transmits the control command to the robot control device 2.

The robot control device 2 acquires the control command transmitted from the offline teaching device 5, and drives the sensor 4 of the welding robot MC1 based on the scanning operation teaching program corresponding to the workpiece Wk which is designated by the control command and recorded in advance. The sensor 4 scans the welding line and the component of the workpiece Wk including the vicinity of the welding line, and transmits three-dimensional shape data as a scanning result to the offline teaching device 5.

The offline teaching device 5 measures a position and direction (angle) of a feature point (for example, a hole, an edge, or the like of the component) of the component of the workpiece Wk based on the three-dimensional shape data (the scanning result) transmitted from the sensor 4 (St201). Here, the direction (angle) is an angle based on the welding robot coordinate system ΣW.

The offline teaching device 5 compares the position of the measured feature point with the position of the feature point included in the workpiece information or the jig information, and determines whether the feature point is normally detected (St202). Here, "normally" may indicate that the feature point is detected, or may indicate that a probability that the detected feature point is a feature point to be detected is equal to or more than a predetermined value.

In response to determining in the process of step St202 that the feature point is normally detected (St202, YES), the offline teaching device 5 calculates each of the measured positional deviation amount and direction (a positional deviation angle) of the feature data based on the measured position of the feature data and a position of the feature data in an initial state (St203). Here, the position of the feature data in the initial state is position information and angle information of a feature point stored in the workpiece information of the workpiece Wk or the jig information of the jig FIX.

On the other hand, in response to determining in the process of step St202 that the feature point is not normally detected (St202, NO), the offline teaching device 5 modifies a measurement condition of the welding line of the workpiece Wk (St204). Here, the measurement condition of the welding line is a condition for scanning the welding line and the vicinity including the welding line to measure a feature point, and is a condition such as a scanning speed of the sensor 4, a resolution, a filtering intensity of an optical sensor, a noise removal level, a frequency band, filtering (a low-pass filter, enabling/disabling of a high-pass filter), and smoothing.

The offline teaching device 5 generates a control command for re-scanning a measurement condition of the welding line after the modification and the welding line of the workpiece Wk, and transmits the control command to the robot control device 2 (St204).

The offline teaching device 5 determines whether the measurement of all the welding lines of the workpiece Wk is completed (St205).

In response to determining in the process of step St205 that the measurement of all the welding lines of the workpiece Wk is completed (St205, YES), the offline teaching device 5 corrects the welding operation teaching program based on each of the calculated positional deviation amount and direction (the positional deviation angle) of the feature point (St206).

Specifically, the offline teaching device 5 corrects the welding operation teaching program by changing the position information and the angle information of all the teaching points included in the welding operation teaching program corresponding to the workpiece Wk so as to cancel each of the calculated positional deviation amount and direction (the positional deviation angle) of the feature point (St206). The offline teaching device 5 permanently changes the welding operation teaching program before correction to the corrected welding operation teaching program (St206). The offline teaching device 5 may generate a notification indicating that the correction of the welding operation teaching program is completed, and output the generated notification to the monitor MN3. Here, the "permanently" indicates a period from a timing when the process of step St104 is completed to a timing when the teaching program to be permanently changed is created again.

The offline teaching device 5 stores the welding operation teaching program after the correction in the memory 52, and transmits the welding operation teaching program after the correction to the robot control device 2 for storage. The offline teaching device 5 may correct not only the welding operation teaching program but also the scanning operation teaching program. When the scanning operation teaching program is corrected, the offline teaching device 5 stores the welding operation teaching program after the correction in the memory 52, and transmits the welding operation teaching program after the correction to the robot control device 2 for storage.

On the other hand, in response to determining in the process of step St205 that the measurement of all the welding lines of the workpiece Wk is not completed (St205, YES), the offline teaching device 5 selects an unmeasured welding line among the welding lines of the workpiece Wk (St207). The offline teaching device 5 executes measurement of the welding line selected by the sensor 4 and each component near the welding line (St201).

As described above, when a positional deviation occurs in the component of the workpiece Wk due to a change in the machining condition of the workpiece Wk, a change in the lot of the components of the workpiece Wk, or the like (that is, when a positional deviation corresponds to the positional deviation form (2) occurs), the offline teaching device 5 according to the embodiment calculates a position difference and an angle difference between the position and the angle of the feature point in the initial state and a position and an angle of a feature point after the machining condition or the lot changes. Accordingly, the offline teaching device 5 can collectively correct the positions and angles of all the teaching points that are included in the welding operation teaching program before correction or the welding operation teaching program corrected corresponding to the positional deviation form (1) and that require correction. That is, the offline teaching device 5 can realize more efficient correction of the welding operation teaching program.

In addition, when a positional deviation occurs in which an occurrence frequency of a change is not so often, such as a change in the machining condition of the workpiece Wk or a change in the lot of the components of the workpiece Wk (that is, when the positional deviation corresponds to the positional deviation form (2) occurs), the offline teaching device 5 continues to use the welding operation teaching program after the correction until the machining condition of the workpiece Wk or the change in the lot of the components is changed again (for example, the periods t12, t14, t16, and t22 illustrated in FIG. 5). Accordingly, the offline teaching device 5 can more effectively prevent an increase in a correction frequency or a correction amount of the welding operation teaching program.

Next, an operation procedure of the offline teaching device 5 in the positional deviation form (3) will be described with reference to FIG. 9. FIG. 9 is a flowchart illustrating a third correction procedure example of the teaching program by the offline teaching device 5. Here, the third correction procedure is a correction procedure of the welding operation teaching program corresponding to the positional deviation form (3), and illustrates a correction procedure of the welding operation teaching program executed when the correction of the welding operation teaching program is necessary for each welding line of the workpiece Wk.

Since the processes of steps St201 to St204 illustrated in FIG. 9 are the same as the processes of steps St201 to St204 described with reference to FIG. 8, description thereof will be omitted.

In response to determining in the process of step St13 that the workpiece Wk as the next main welding target is set as the position correction target (St13, YES), the offline teaching device 5 determines that a positional deviation of the positional deviation form (3) based on the individual difference of the workpiece Wk occurs.

The offline teaching device 5 determines whether the measurement of the positions corresponding to all the welding lines of the workpiece Wk is completed (St205).

In response to determining in the process of step St205 that the measurement of the positions corresponding to all the welding lines of the workpiece Wk is completed (St205, YES), the offline teaching device 5 generates temporary position information of the welding lines in which the positions of the welding line of the workpiece Wk are corrected, based on the calculated positional deviation amount and direction (the positional deviation angle) of the feature point (St208).

Specifically, the offline teaching device 5 corrects the position information of the welding line by changing the position information and the angle information of all the teaching points included in the welding operation teaching program corresponding to the workpiece Wk so as to cancel each of the calculated positional deviation amount and direction (the positional deviation angle) of the feature point (St208). The offline teaching device 5 may generate a notification indicating that the correction of the welding operation teaching program is completed, and output the generated notification to the monitor MN3.

On the other hand, in response to determining in the process of step St205 that the measurement of the positions corresponding to all the welding lines of the workpiece Wk is not completed (St205, YES), the offline teaching device 5 selects an unmeasured welding line among the welding lines of the workpiece Wk (St207). The offline teaching device 5 executes measurement of the selected welding line and each component near the welding line (St201).

As described above, when a positional deviation occurs in the component of the workpiece Wk due to the individual difference of the workpiece Wk (that is, when a positional deviation corresponds to the positional deviation form (3) occurs), the offline teaching device 5 according to the embodiment calculates a position difference and an angle difference between the position and the angle of the feature point in the initial state and a position and an angle of a feature point of the workpiece Wk to be machined (main welding). Accordingly, the offline teaching device 5 can collectively correct the positions and angles of all the teaching points that are included in the welding operation teaching program before correction or the welding operation teaching program corrected corresponding to the positional deviation form (1) or the positional deviation form (2) and that require correction. That is, the offline teaching device 5 can realize more efficient correction of the welding operation teaching program.

In addition, when a positional deviation occurs for each workpiece Wk (that is, when a positional deviation corresponding to the positional deviation form (3) occurs), such as the individual difference of the workpieces Wk (that is, a variation in machining accuracy (quality) of each component of the workpiece Wk), the offline teaching device 5 generates temporary position information of a welding line (that is, a machining portion) used only in each workpiece Wk (for example, in each of periods t131 to t133, t151 to t154, t171 to t172, t231 to t232 illustrated in FIG. 5). Accordingly, the offline teaching device 5 can correct a teaching program corresponding to an individual difference for each workpiece Wk by finely modifying the welding operation teaching program, and can more effectively prevent an increase in correction amount. Since the offline teaching device 5 can improve the machining accuracy of the workpiece Wk, the offline teaching device 5 is also useful for correction of a teaching program when high-precision machining of the workpiece Wk is required.

As described above, the offline teaching device 5 according to the embodiment includes: the processor 51 (an example of a first determination unit) that determines whether data related to the production of the workpiece Wk (for example, the information related to the facility, the workpiece information of the workpiece Wk, and the jig information of the workpiece Wk) to be produced by welding is changed; the processor 51 (an example of a second determination unit) that determines, when the processor 51 determines that the data is changed, a target (for example, the entire workpiece, the component of the workpiece Wk, and the welding line) whose relative position between the workpiece Wk and the welding robot MC1 that executes welding changes based on the changed data; and the welding operation creation unit 551 (an example of a teaching program creation unit) that generates and outputs a second teaching program obtained by correcting a first teaching program for executing the welding, based on a displacement amount between a position of the target after the change of the relative position and a position of the target before the change of the relative position. When the target whose relative position between the welding robots MC1 before and after the change changes is the entire workpiece Wk, the offline teaching device 5 calculates a displacement amount of the entire workpiece Wk by calculating a displacement amount of a pattern provided on the workpiece Wk or the jig FIX. When the target whose relative position between the welding robots MC1 before and after the change changes is at least one component constituting the workpiece Wk (that is, a part of the workpiece Wk), the offline teaching device 5 calculates a displacement amount of the component of the workpiece Wk by calculating a displacement amount for each welding line of the workpiece Wk.

Accordingly, when the data related to the production of the workpiece Wk is changed, the offline teaching device 5 according to the embodiment corrects the teaching point of the welding operation teaching program based on an amount of change in the relative position between the welding robot MC1 and the target before and after the change of the data related to the production with reference to the welding robot coordinate system 2W, so that man-hours for correcting the welding operation teaching program can be more efficiently reduced.

The processor 51 of the offline teaching device 5 according to the embodiment determines the target and a change frequency of the relative position based on the changed data, and determines whether to permanently change the first teaching program to the second teaching program based on the change frequency of the relative position and the target. Accordingly, the offline teaching device 5 according to the embodiment can permanently change the welding of the workpiece Wk to the second teaching program until the data related to the production of the workpiece Wk is changed again, so that the welding operation teaching program can be corrected more efficiently.

When the processor 51 determines that the target is the entire workpiece Wk, the welding operation creation unit 551 of the offline teaching device 5 according to the embodiment creates and outputs a second teaching program for permanently changing the first teaching program. Accordingly, when it is determined that there is the positional deviation form (1) in which the positional deviation occurs in the entire workpiece Wk, the offline teaching device 5 according to the embodiment can permanently change the welding of the workpiece Wk to the second teaching program until the data related to the production of the workpiece Wk is changed again, so that the welding operation teaching program can be corrected more efficiently.

When the processor 51 of the offline teaching device 5 according to the embodiment determines that the target is a part of the workpiece Wk based on the changed data, the processor 51 further determines whether the data is changed for each workpiece Wk. When the processor 51 determines that the data is changed for each workpiece Wk, the welding operation creation unit 551 creates and outputs a second teaching program for temporarily changing the first teaching program. Accordingly, when it is determined that there is the positional deviation form (3) in which a positional deviation occurs in a part of the workpiece Wk and a positional deviation does not occur for each workpiece Wk, the offline teaching device 5 according to the embodiment can temporarily use the second teaching program only while the production of the workpiece Wk is executed, and can use an original teaching program (that is, the first teaching program) in the production of the next workpiece Wk, so that the correction amount of the welding operation teaching program can be reduced more efficiently.

When the processor 51 of the offline teaching device 5 according to the embodiment determines that the target is a part of the workpiece Wk based on the changed data, the processor 51 further determines whether the data is changed for each workpiece. When the processor 51 determines that the data is not changed for each workpiece Wk, the welding operation creation unit 551 creates and outputs the second teaching program for permanently changing the first teaching program. Accordingly, when it is determined that there is the positional deviation form (2) in which a positional deviation occurs in a part of the workpiece Wk and a positional deviation does not occur for each workpiece Wk, the offline teaching device 5 according to the embodiment can permanently change the welding of the workpiece Wk to the second teaching program until the data related to the production of the workpiece Wk is changed again, so that the welding operation teaching program can be corrected more efficiently.

When the processor 51 determines that the data is not changed for each workpiece Wk, the welding operation creation unit 551 of the offline teaching device 5 according to the embodiment creates and outputs the second teaching program for permanently changing the first teaching program. According to this, when it is determined that there is the positional deviation form (1) or the positional deviation form (2) in which a positional deviation does not occur for each workpiece Wk, the offline teaching device 5 according to the embodiment can permanently change the welding of the workpiece Wk to the second teaching program until the data related to the production of the workpiece Wk is changed again, so that the welding operation teaching program can be corrected more efficiently.

When the processor 51 determines that the data is changed for each workpiece, the welding operation creation unit 551 of the offline teaching device 5 according to the embodiment creates and outputs the second teaching program for temporarily changing the first teaching program. Accordingly, when it is determined that there is the positional deviation form (3) in which a positional deviation occurs for each workpiece Wk, the offline teaching device 5 according to the embodiment can temporarily use the second teaching program only while the production of the workpiece Wk is executed, and can use an original teaching program (that is, the first teaching program) in the production of the next workpiece Wk, so that the correction amount of the welding operation teaching program can be reduced more efficiently.

When the processor 51 determines that the changed data is data related to a production facility of the workpiece Wk, the welding operation creation unit 551 of the offline teaching device 5 according to the embodiment creates and outputs the second teaching program for permanently changing the first teaching program. Accordingly, when it is determined that there is the positional deviation form (1) in which a positional deviation occurs based on a change in a layout of a facility for producing the workpiece Wk, the offline teaching device 5 according to the embodiment can permanently change the welding of the workpiece Wk to the second teaching program until the data related to the production of the workpiece Wk is changed again, so that the welding operation teaching program can be corrected more efficiently.

When the processor 51 determines that the changed data is data related to the welding condition of the workpiece Wk, the welding operation creation unit 551 of the offline teaching device 5 according to the embodiment creates and outputs the second teaching program for permanently changing the first teaching program. Accordingly, when it is determined that there is the positional deviation form (2) in which a positional deviation based on a change of the welding condition (machining condition) of the workpiece Wk occurs, the offline teaching device 5 according to the embodiment can permanently change the welding of the workpiece Wk to the second teaching program until the data related to the production of the workpiece Wk is changed again, so that the welding operation teaching program can be corrected more efficiently.

When the processor 51 determines that the changed data is data related to a lot of components used for the production of the workpiece Wk, the welding operation creation unit 551 of the offline teaching device 5 according to the embodiment creates and outputs the second teaching program for permanently changing the first teaching program. Accordingly, when it is determined that there is the positional deviation form (2) in which a positional deviation based on a change in a lot of the components of the workpiece Wk occurs, the offline teaching device 5 according to the embodiment can permanently change the welding of the workpiece Wk to the second teaching program until the data related to the production of the workpiece Wk is changed again, so that the welding operation teaching program can be corrected more efficiently.

When the first determination unit determines that the data is not changed, the processor 51 of the offline teaching device 5 according to the embodiment further determines whether the workpiece Wk is a position correction target based on the data. In response to determining that the workpiece Wk is the position correction target, the processor 51 determines that the target is at least one component constituting the workpiece. The welding operation creation unit 551 creates and outputs the second teaching program for temporarily changing the first teaching program. Accordingly, when it is determined that there is the positional deviation form (3) in which a positional deviation based on the individual difference for each workpiece Wk occurs, the offline teaching device 5 according to the embodiment can temporarily use the second teaching program only while the production of the workpiece Wk is executed, and can use an original teaching program (that is, the first teaching program) in the production of the next workpiece Wk, so that the correction amount of the welding operation teaching program can be reduced more efficiently.

When the target is the entire workpiece Wk, the welding operation creation unit 551 of the offline teaching device 5 according to the embodiment creates and outputs a second teaching program obtained by correcting the first teaching program based on a displacement amount between a position after the change of the relative position of a pattern positioned on the workpiece Wk and a position of the pattern before the change of the relative position. In view of this, when it is determined that there is the positional deviation form (1) in which the positional deviation occurs in the entire workpiece Wk, the offline teaching device 5 according to the embodiment calculates the displacement amount of the entire workpiece Wk by calculating the displacement amount of the pattern provided on the workpiece Wk or the jig FIX. The offline teaching device 5 can more effectively correct the welding operation teaching program based on the calculated displacement amount.

When the target is a part of the workpiece Wk, the welding operation creation unit 551 of the offline teaching device 5 according to the embodiment creates and outputs a second teaching program obtained by correcting the first teaching program for each welding line, based on a displacement amount between a position after the change of the relative position of a feature point positioned in a vicinity of at least one welding line to be welded and a position of the feature point before the change of the relative position.

Accordingly, when it is determined that there is the positional deviation form (2) or the positional deviation form (3) in which the positional deviation occurs in a part of the workpiece Wk, the offline teaching device 5 according to the embodiment can more effectively correct the welding operation teaching program for each welding line of the workpiece Wk by calculating the displacement amount for each welding line of the workpiece Wk.

Accordingly, the present disclosure provides an offline teaching method executed by the offline teaching device 5 according to the embodiment including one or more computers communicably connected to the sensor 4 capable of measuring a position of at least one target constituting the workpiece Wk to be produced by welding, and the offline teaching method includes: receiving an input of data in which data related to production of the workpiece Wk (for example, information related to the facility, workpiece information of the workpiece Wk, and jig information on the workpiece Wk) is changed; determining, based on the changed data, a target (for example, the entire workpiece, a component of the workpiece Wk, and a welding line) whose relative position between the workpiece Wk and a welding robot that executes the welding is changed; and creating and outputting a second teaching program obtained by correcting a first teaching program for executing the welding, based on a displacement amount between a position of the target after the change of the relative position and a position of the target before the change of the relative position. Here, the computer includes the offline teaching device 5.

Accordingly, when the data related to the production of the workpiece Wk is changed, the offline teaching device 5 according to the embodiment corrects the teaching point of the welding operation teaching program based on an amount of change in the relative position between the welding robot MC1 and the target before and after the change of the data related to the production with reference to the welding robot coordinate system ΣW, so that man-hours for correcting the welding operation teaching program can be more efficiently reduced.

Although various embodiments are described above with reference to the drawings, it is needless to say that the present disclosure is not limited to such examples. It is apparent to a person skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the various embodiments described above may be combined freely in a range without deviating from the spirit of the disclosure.

INDUSTRIAL APPLICABILITY

The present disclosure is useful as an offline teaching device and an offline teaching method that efficiently reduce man-hours for correcting a teaching point of a teaching program.

What is claimed is:

1. An offline teaching device comprising:
- a processor configured to operate as a first determination unit and a second determination unit;
- the first determination unit configured to determine whether data related to production of a workpiece to be produced by welding is changed;
- the second determination unit configured to determine, in a case where the first determination unit determines that the data is changed, a target whose relative position between the workpiece and a welding robot that executes the welding is changed based on the changed data; and
- a teaching program creation unit configured to create and output a second teaching program obtained by correcting a first teaching program for executing the welding, based on a displacement amount between a position of the target after the change of the relative position and a position of the target before the change of the relative position.

2. The offline teaching device according to claim 1, wherein
- the second determination unit is configured to
  - determine the target and a change frequency of the relative position based on the changed data, and
  - determine whether to permanently change the first teaching program to the second teaching program based on the change frequency of the relative position and the target.

3. The offline teaching device according to claim 1, wherein
- the teaching program creation unit is configured to
  - create and output the second teaching program for permanently changing the first teaching program in a case where the second determination unit determines that the target is the entire workpiece.

4. The offline teaching device according to claim 1, wherein
- the second determination unit is configured to
  - further determine whether the data is changed for each workpiece in a case where it is determined that the target is a part of the workpiece based on the changed data, and
- the teaching program creation unit is configured to
  - create and output the second teaching program for temporarily changing the first teaching program in a case where the second determination unit determines that the data is changed for each workpiece.

5. The offline teaching device according to claim 1, wherein
- the second determination unit is configured to
  - further determine whether the data is changed for each workpiece in a case where it is determined that the target is a part of the workpiece based on the changed data, and
- the teaching program creation unit is configured to
  - create and output the second teaching program for permanently changing the first teaching program in a case where the second determination unit determines that the data is not changed for each workpiece.

6. The offline teaching device according to claim 1, wherein
- the teaching program creation unit is configured to
  - create and output the second teaching program for permanently changing the first teaching program in a case where the second determination unit determines that the data is not changed for each workpiece.

7. The offline teaching device according to claim 1, wherein
- the teaching program creation unit is configured to
  - create and output the second teaching program for temporarily changing the first teaching program in a case where the second determination unit determines that the data is changed for each workpiece.

8. The offline teaching device according to claim 1, wherein the teaching program creation unit is configured to create and output the second teaching program for permanently changing the first teaching program in a case where the second determination unit determines that the changed data is data related to a production facility of the workpiece.

9. The offline teaching device according to claim 1, wherein the teaching program creation unit is configured to create and output the second teaching program for permanently changing the first teaching program in a case where the second determination unit determines that the changed data is data related to a welding condition of the workpiece.

10. The offline teaching device according to claim 1, wherein the teaching program creation unit is configured to create and output the second teaching program for permanently changing the first teaching program in a case where the second determination unit determines that the changed data is data related to a lot of components used for the production of the workpiece.

11. The offline teaching device according to claim 1, wherein the second determination unit is configured to determine whether the workpiece is a position correction target based on the data in a case where the first determination unit determines that the data is not changed, and determine that the target is at least one component constituting the workpiece in a case where it is determined that the workpiece is the position correction target, and the teaching program creation unit is configured to create and output the second teaching program for temporarily changing the first teaching program.

12. The offline teaching device according to claim 1, wherein the teaching program creation unit is configured to in a case where the target is the entire workpiece, create and output the second teaching program obtained by correcting the first teaching program, based on a displacement amount between a position after the change of the relative position of a pattern provided on the workpiece and a position of the pattern before the change of the relative position.

13. The offline teaching device according to claim 1, wherein the teaching program creation unit is configured to in a case where the target is a part of the workpiece, create and output the second teaching program obtained by correcting the first teaching program for each welding line, based on a displacement amount between a position after the change of the relative position of a feature point positioned in a vicinity of at least one welding line to be welded and a position of the feature point before the change of the relative position.

14. An offline teaching method executed by an offline teaching device including one or more computers communicably connected to a sensor capable of measuring a position of at least one target constituting a workpiece to be produced by welding, the offline teaching method comprising:

determining, in a case where it is determined that data related to production of the workpiece is changed, a target whose relative position between the workpiece and a welding robot that executes the welding is changed based on the changed data; and creating and outputting a second teaching program obtained by correcting a first teaching program for executing the welding, based on a displacement amount between a position of the target after the change of the relative position and a position of the target before the change of the relative position.

15. An offline teaching method executed by an offline teaching device including one or more computers communicably connected to a sensor capable of measuring a position of at least one target constituting a workpiece to be produced by welding, the offline teaching method comprising:

receiving an input of data in which data related to production of the workpiece is changed;

determining, based on the changed data, a target whose relative position between the workpiece and a welding robot that executes the welding is changed; and creating and outputting a second teaching program obtained by correcting a first teaching program for executing the welding, based on a displacement amount between a position of the target after the change of the relative position and a position of the target before the change of the relative position.

* * * * *